(12) United States Patent
Cho et al.

(10) Patent No.: US 9,891,662 B2
(45) Date of Patent: Feb. 13, 2018

(54) DOUBLE UNLOCKING APPARATUS OF A PORTABLE DEVICE EQUIPPED WITH AN EXPANDABLE DISPLAY AND CONTROLLING METHOD THEREOF

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1032 days.

(21) Appl. No.: 13/862,108

(22) Filed: Apr. 12, 2013

(65) Prior Publication Data

US 2014/0247229 A1 Sep. 4, 2014

(30) Foreign Application Priority Data

Mar. 4, 2013 (KR) .................. 10-2013-0022811
Mar. 21, 2013 (WO) ............... PCT/KR2013/002352

(51) Int. Cl.
*G06F 1/16* (2006.01)
*G06F 3/0488* (2013.01)

(52) U.S. Cl.
CPC .......... *G06F 1/1616* (2013.01); *G06F 1/1624* (2013.01); *G06F 1/1647* (2013.01);
(Continued)

(58) Field of Classification Search
CPC .... G06F 3/1423; G06F 1/1647; G06F 1/1692; G06F 1/1652; G06F 1/165; G06F 1/1649; G06F 1/1641
See application file for complete search history.

(56) References Cited

U.S. PATENT DOCUMENTS

2008/0180399 A1  7/2008  Cheng
2009/0298537 A1  12/2009  Choi
(Continued)

FOREIGN PATENT DOCUMENTS

CN        1921672 A        2/2007
KR   10-2010-0019164 A     2/2010

*Primary Examiner* — Grant Sitta
*Assistant Examiner* — Amen Bogale
(74) *Attorney, Agent, or Firm* — Birch, Stewart, Kolasch & Birch, LLP

(57) ABSTRACT

According to one embodiment disclosed to achieve the aforementioned object, the present specification provides a method of controlling a portable device including the steps of if the portable device is a first mode to lock the portable device, detecting an unlocking triggering signal, if the unlocking triggering signal is detected, converting the portable device to a second mode to display an unlocking interface in the expandable display, if a touch input signal for the unlocking interface is detected when the portable device is the second mode, recognizing a touch input pattern from the detected touch input, displaying the unlocking interface by reflecting to the touch input pattern and if the touch input pattern is matched with a pre-set pattern, converting the portable device to a third mode to unlock the portable device, and if the expandable display expands when the portable device is the second mode, displaying the unlocking interface by reflecting to an expansion of the expandable display and if a degree of expansion of the expandable display is greater than a threshold, converting the portable device to the third mode.

20 Claims, 14 Drawing Sheets

(52) U.S. Cl.
CPC .......... *G06F 1/1652* (2013.01); *G06F 1/1677* (2013.01); *G06F 3/04883* (2013.01)

(56) References Cited

U.S. PATENT DOCUMENTS

| | | | |
|---|---|---|---|
| 2010/0056223 A1 | 3/2010 | Choi et al. | |
| 2010/0117975 A1* | 5/2010 | Cho | G06F 1/1626 345/173 |
| 2010/0302179 A1* | 12/2010 | Ahn | G06F 1/1618 345/173 |
| 2011/0006971 A1* | 1/2011 | Ebey | G06F 1/1616 345/1.3 |
| 2011/0256848 A1* | 10/2011 | Bok, II | G06F 3/04883 455/411 |
| 2012/0229520 A1 | 9/2012 | Mikami et al. | |
| 2012/0274570 A1 | 11/2012 | Kim | |
| 2012/0299813 A1 | 11/2012 | Kang et al. | |
| 2013/0019199 A1 | 1/2013 | Ko et al. | |
| 2013/0296000 A1* | 11/2013 | Park | G09G 3/001 455/566 |
| 2013/0307816 A1* | 11/2013 | Lee | G06F 1/1652 345/174 |
| 2014/0062976 A1* | 3/2014 | Park | G09G 5/00 345/204 |

\* cited by examiner

FIG. 2A

| device status | operation |
| --- | --- |
| 1st mode (locking) | deactivate at least one of expandable display and sensor unit |
| 2nd mode (unlocking standby) | activate at least one of expandable display and sensor unit / display unlocking interface |
| 3rd mode (unlocking) | activate expandable display and sensor unit / display standby screen or executing screen of application executed before cutting off power of display |

(1) 1st size status — expansion → 2nd size status (2) 1st size status — expansion → 2nd size status (3) 1st size status — expansion → 2nd size status (4) 1st size status — expansion → 2nd size status

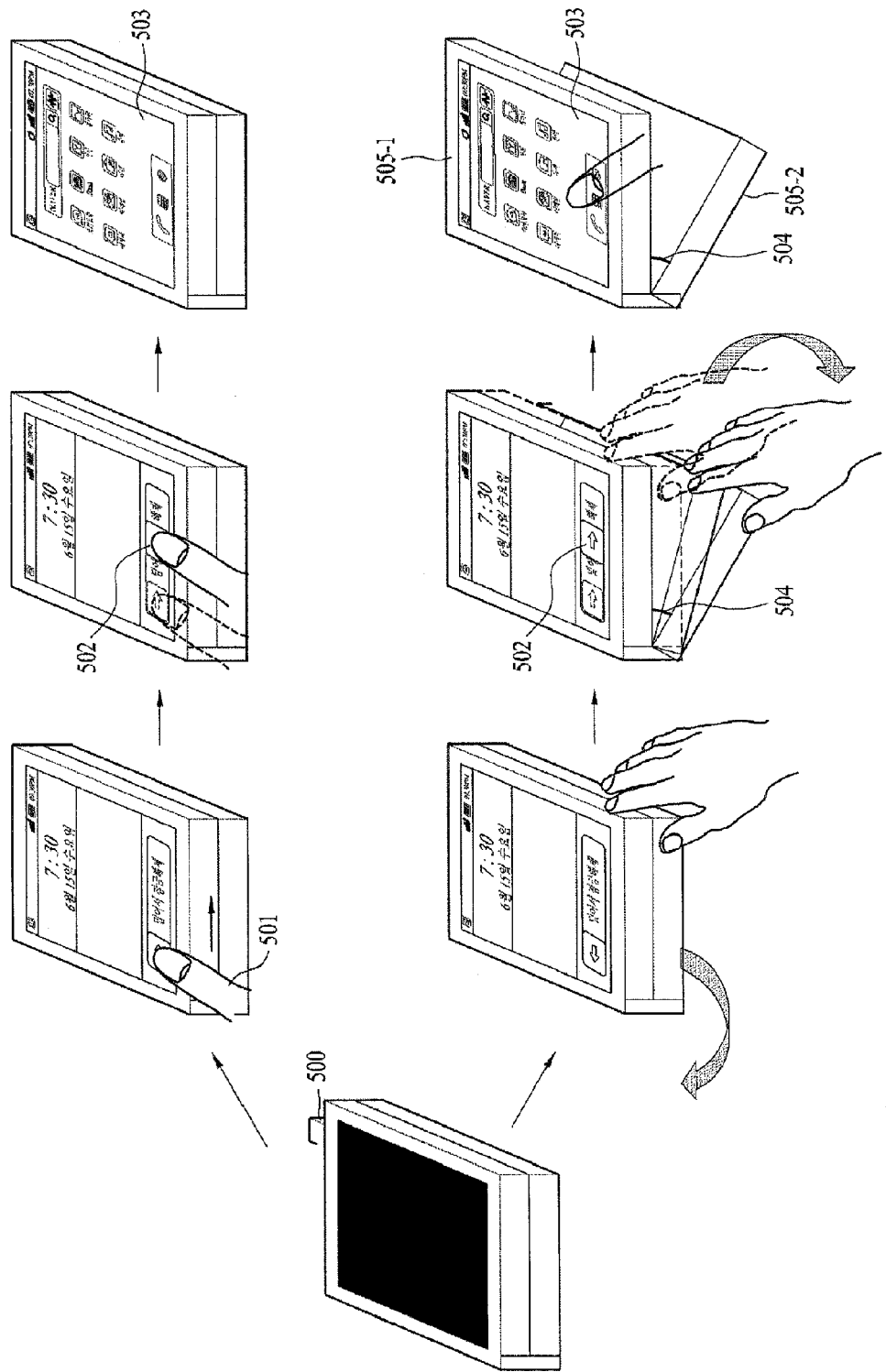

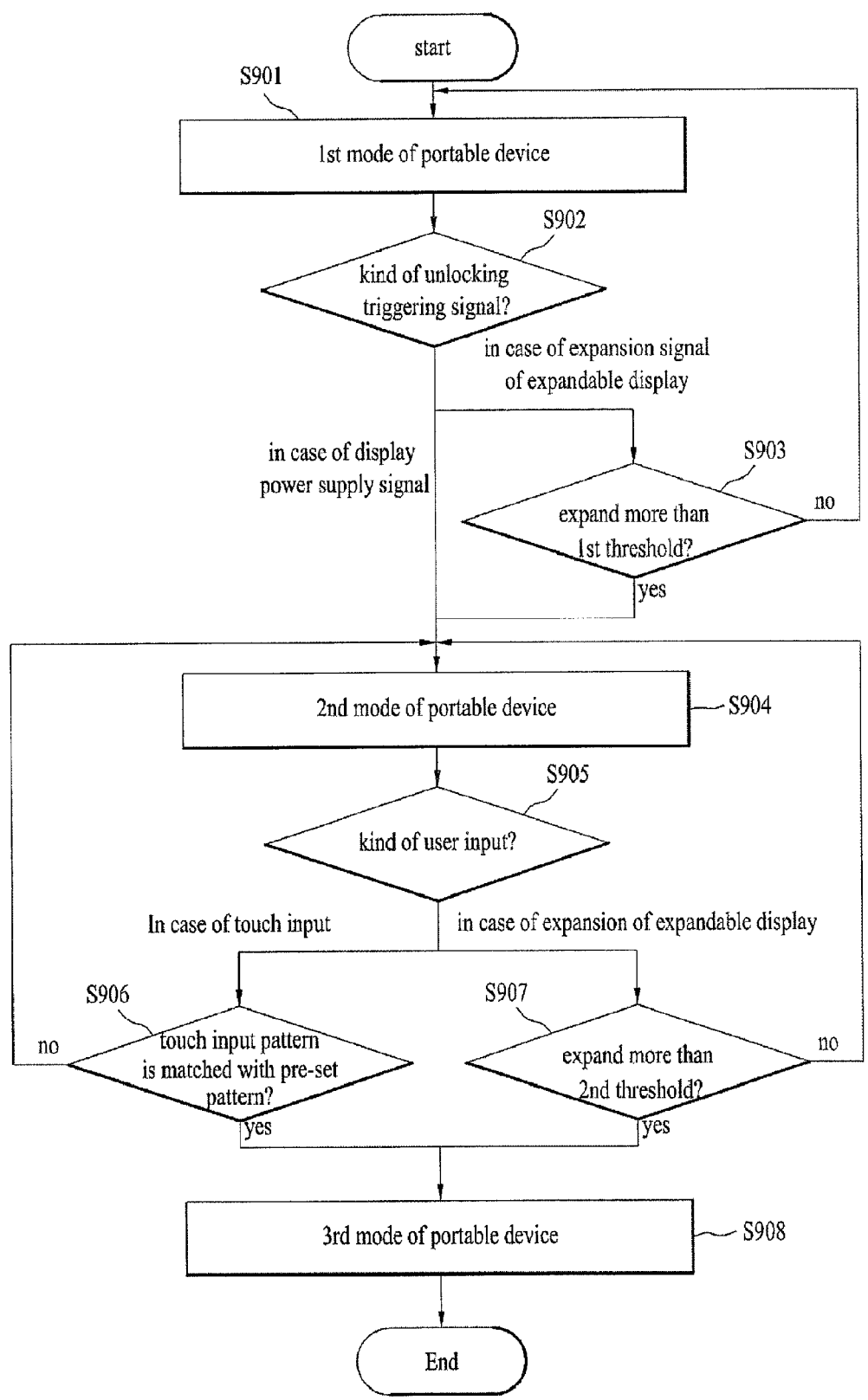

DOUBLE UNLOCKING APPARATUS OF A PORTABLE DEVICE EQUIPPED WITH AN EXPANDABLE DISPLAY AND CONTROLLING METHOD THEREOF

Pursuant to 35 U.S.C. § 119(a), this application claims the benefit of the Korean Patent Application No. 10-2013-0022811, filed on Mar. 4, 2013 and International Application No. PCT/KR2013/002352 filed on Mar. 21, 2013, which is hereby incorporated by reference as if fully set forth herein.

BACKGROUND OF THE INVENTION

Field of the Invention

The present specification relates to a portable device equipped with an expandable display and controlling method thereof, and more particularly, to an apparatus controlling an unlocking of a portable device according to an expansion degree of the expandable display and controlling method thereof.

Discussion of the Related Art

In terms of using an electronic device by a user, mobility has been a significant issue all the time. In particular, various electronic devices possessing a performance corresponding to a desktop computer as well as a cellular phone are on sale recently. Since these electronic devices decreased in size and weight, it enabled the user to use various electronic information while on the move.

In case of these devices, they enabled various functions to be performed in addition to such a basic function as a conventional data transmission/reception. Hence, a user should able to control the devices more conveniently and precisely. In particular, in case of recent devices, an expansion of a display is enabled according to the use of the expandable display panel. Therefore, it is necessary to provide a control method for user convenience according to the expansion of the display.

SUMMARY OF THE INVENTION

According to one embodiment, it is intended to provide an apparatus controlling a locking of a device according to an expansion length of an expandable display and controlling method thereof.

According to a different embodiment, it is intended to provide an apparatus controlling a locking of a device according to a folding angle of an expandable display and controlling method thereof.

According to a different embodiment, it is intended to provide an apparatus providing an identical unlocking interface according to a touch input pattern and an expansion degree of an expandable display and controlling method thereof.

According to a different embodiment, it is intended to provide an apparatus providing various unlocking triggering signals and controlling method thereof.

According to a different embodiment, it is intended to provide if an expandable display expands more than a 1st threshold, an apparatus unlocking mode of a device and controlling method thereof.

According to a different embodiment, it is intended to provide if an expandable display expands more than a 2nd threshold, an apparatus supplying a power to an expandable display and controlling method thereof.

According to a different embodiment, it is intended to provide an apparatus providing an unlocking interface indicating a degree of additional expansion of an expandable display to unlock a portable device and controlling method thereof. Moreover, it is intended to provide various animation effects in the unlocking interface.

To achieve these and other advantages and in accordance with the purpose of the present specification, as embodied and broadly described, according to one embodiment, a method of controlling a portable device equipped with an expandable display includes the steps of if the portable device is a first mode to lock the portable device, detecting an unlocking triggering signal, if the unlocking triggering signal is detected, converting the portable device to a second mode to display an unlocking interface in the expandable display, if a touch input signal for the unlocking interface is detected when the portable device is the second mode, recognizing a touch input pattern from the detected touch input, displaying the unlocking interface by reflecting to the touch input pattern and if the touch input pattern is matched with a pre-set pattern, converting the portable device to a third mode to unlock the portable device, and if the expandable display expands when the portable device is the second mode, displaying the unlocking interface by reflecting to an expansion of the expandable display and if a degree of expansion of the expandable display is greater than a threshold, converting the portable device to the third mode.

According to one embodiment, since various methods are provided to unlock a portable device, a user interface for unlocking may be more diversified. Hence, a user may unlock the portable device by selecting a simple and easy unlocking method according to a situation.

And, since an unlocking of the portable device is controlled according to a degree of expansion of an expandable display as well as a touch input, it may provide the user with a more intuitive unlocking method. In case of a portable device equipped with a flexible display, if the flexible display expands more than a prescribed length, the portable device may be unlocked. Because it is coincided with the intention of a user that the flexible display expands more than the prescribed length to use the device. And, in case of a portable device equipped with a foldable or bendable display, if the flexible display is unfolded more than a prescribed angle, the portable device may be unlocked. Because it is coincided with the intention of a user that the flexible display is unfolded more than the prescribed angle to use the device.

According to a different embodiment, an identical unlocking interface being provided an animation effect according to a touch input pattern or the degree of expansion of the expandable display can be displayed. Since the identical unlocking interface is displayed, the user may identify that an unlocking of a device can be achieved by various ways.

According to a different embodiment, since the unlocking interface indicates an unlocking degree, it may provide a user with information on a degree of additional expansion of the expandable display for the unlocking.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2*a* is a table explaining 3 kinds of modes capable of operating until a portable device is unlocked;

FIG. 5a is a diagram of a device showing a procedure of converting to a 3rd mode according to one embodiment;

FIG. 8 and FIG. 9 are flowcharts of a portable device converting a mode according to a touch input of a user and a degree of expansion of an expandable display.

DETAILED DESCRIPTION OF THE INVENTION

Figure 1:
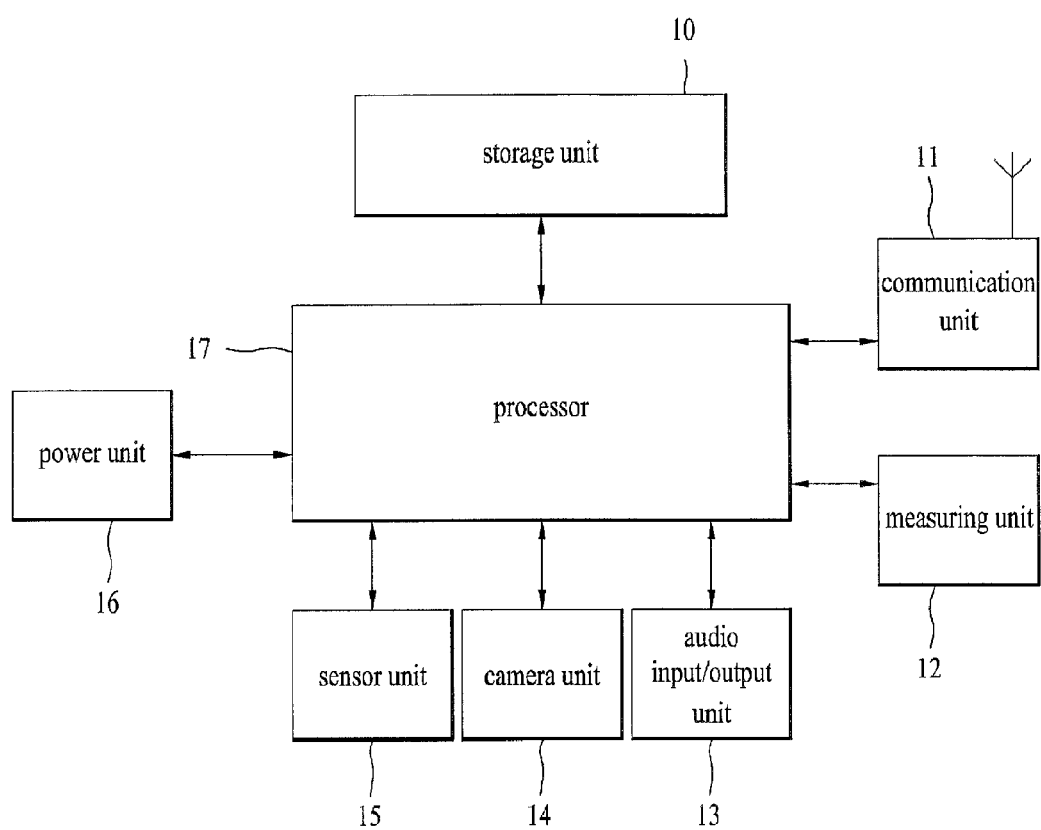
FIG. 1 is a block diagram of a device according to one embodiment.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, although embodiments are explained in detail with reference to the attached drawings and the contents written on them, a scope intended to claim may be non-limited or non-restricted by the embodiments.

As an electronic device manufacturing technology has been developed, a miniaturization on digital devices is being made. The present specification is related to a portable electronic device. In the following description, the portable electronic device is commonly called a portable device. The portable device means a various electronic devices having mobility and may include such an electronic device as a cellular phone, a PDA (personal digital assistants), a notebook, a tablet PC, a MP3 player, a CD player, a DVD player, and the like. In the following description, the portable device may be abbreviated as a device.

Unlike the miniaturization on a device, a display mounted on the device becomes enlarging. Recent enlargement of a display is achieved by such a various method as 1) a plurality of displays are mounted on a device, 2) a flexible display is mounted on a device, and the like. In particular, recently, according to the development of a display element technology, a flexible display is being commercialized. The flexible display may indicate the display manufactured on a flexible panel capable of being twisted, bent, and rolled without the loss of a display property unlike a conventional hard display panel. The flexible display is also called an e-paper. The flexible display is lighter, thinner, has more strong impact resistance than the conventional hard display, and has a feature capable of being bent freely. In case of the flexible display, a panel can be manufactured by a metal foil, an ultrathin glass, or a plastic panel. In particular, in case of the plastic panel, a PC panel, a PET panel, a PES panel, a PI panel, a PEN panel, an AryLite panel and the like can be used. In the present specification, all displays capable of expanding an area of displaying are commonly called an expandable display. In other word, the expandable display uses at least one flexible display or a distinguished plurality of displays and indicates a display capable of controlling the area of displaying. More specifically, in case that the displaying area expands by adding a display panel in a manner of preparing a plurality of display panels according to the need, a plurality of the display panels are commonly called an expandable display. Or, in case that the area of displaying expands by unbending or rolling out the aforementioned flexible display, the flexible display may be called the expandable display as well. The expandable display can be abbreviated as a display in the present specification. The expandable display may have a 1st and a 2nd size status. The 1st size status may indicate the size status before the expandable display expands. The 2nd size status may indicate the size status that the expandable display expands. An expansion of the expandable display indicates a case that an area or width of the expandable display capable of displaying an execution screen expands. The expansion of the expandable display can be achieved by unfolding a display in case that a plurality of displays are stored in the device in a manner of being folded. Or, the expansion of the expandable display can be achieved by unbending the display in case that a flexible display is stored in the device in a manner of being bent. Or, the expansion of the expandable display can be achieved by rolling out the display in case that the flexible display is stored in the device in a manner of being rolled in. A reference determining an expansion degree of the expandable display which becomes the reference of operating of the device may correspond to a folding angle, a bending angle, or an expansion length according to the method of storing the expandable display in the device.

FIG. 1 is a block diagram of a device according to one embodiment. Referring to FIG. 1, the device includes a storage unit 10, a communication unit 11, a measuring unit 12, an audio input/output unit 13, a camera unit 14, a sensor unit 15, a power unit 16 and a processor 17.

The storage unit 10 may store such a various digital data as a video, an audio, a picture, a moving image, an application, and the like. The storage unit 10 indicates such a various digital storage space as a flash memory, a HDD (hard disk drive), a SSD (solid state drive), and the like.

The communication unit 11 may perform a communication with an external of the device and transceive data with the external of the device using a various protocols. The communication unit 11 accesses an external network by wired or wireless and may be then able to transceive a digital data with the network.

The measuring unit 12 is a common name for the aforementioned various sensing means. The measuring unit senses various inputs of a user and the environment of the device and may be then able to deliver the sensed result to the device in order for the device to perform an operation according to the sensed result. The aforementioned sensors may be included in the device as a separate element or may be included in the device in a manner of being combined with at least one element.

In the present specification, the measuring unit 12 may be a unit for measuring an expanded degree of the expandable display. In this case, the expanded degree of the expandable display may indicate 1) the degree of expansion of a length or an area of the expandable display and 2) the degree of folding or bending of the expandable display.

If a measuring reference for the expanded degree is an expansion length or an area of a display, the measuring unit 12 may include a measuring unit for measuring an expanded area or an expanded length. In case that the expandable display expands, the measuring unit 12 may measure the area or length of the expandable display, which has expanded to the external of the device. On the contrary, the measuring unit may also measure the area or the length of the expandable display, which has not expanded, of the internal of the device. Or, in case that the expandable display expands or reduces, the measuring unit may measure a displacement value of an expanded or reduced display.

More specifically, the measuring unit 12 may be a sensor configured with at least one of a touch sensor, an infrared/ultraviolet sensor, a photo transistor, a photoconductive element, a position sensitive detector, a gyro, a gyroscope sensor and a strain gage, a laser length measuring sensor, a potentiometer, a measuring sensor capable of measuring a travel length, a length, an angular speed, an expansion speed, an instantaneous speed, and an average speed. The measuring unit 12 may be non-limited to the aforementioned sensors and may include all sensing means capable of measuring a length and an area. The measuring unit 12 can be situated at various positions of the device such as a housing unit, an expandable display itself, a side of the expandable display, or the like. A measuring method may be differentiated according to the position of the measuring unit or the kind of sensor of the measuring unit 12.

If a measuring reference for the expanded degree of the expandable display is a bending or folding angle, the measuring unit 12 may include an angle measuring unit measuring an angle formed by a folded expandable display. More specifically, in case that a foldable display is unfolded or folded, the angle measuring unit may measure the folding angle formed by the displays. Or, in case that a bendable display is unbent or bent, the angle measuring unit may measure the bending angle formed by the display.

If the measuring unit 12 is the angle measuring unit, it may include all measuring sensors capable of measuring an angle such as an electrostatic angle sensor, a potentiometer, a measuring sensor using an angle of inclination, a laser length measuring sensor, an encoder using a travel angle, an absolute angle, an expanded angle, a reduced angle, and a light sensor, and the like. The angle measuring unit 12 can be situated at various positions of the device such as a housing unit, an expandable display itself, a side of the expandable display, or the like. A kind of measuring sensor capable of being used as the angle measuring unit 12 may be diversified as well. A measuring method may be differentiated according to the position of the angle measuring unit or the kind of sensor of the angle measuring unit. A measuring sensor may be non-limited to the aforementioned sensor.

The audio input/output unit 13 may include an audio output means such as a speaker, etc. and an audio input means such as a microphone, etc. and may perform an audio output from the device and audio input to the device. The audio input/output unit 13 can be used as an audio sensor.

The camera unit 14 may perform a photographing and a taking moving image and may be selectively equipped according to embodiment. The camera unit 14 may be used as the aforementioned motion sensor or a visual sensor.

The sensor unit 15 senses environment using at least one sensor installed in the digital device 100 and may deliver the environment to the processor 17 in a form of a signal. And, the sensor unit 15 senses a user input and may deliver a signal according to a sensed result to the processor 17.

The sensor unit 15 may include at least one sensing means. As one embodiment, the at least one sensing means may include various sensing means such as a gravity sensor, a terrestrial magnetism sensor, a motion sensor, a gyroscope sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a grip sensor, and the like.

And, the sensor unit 15 is a common name for the aforementioned various sensing means. The sensor unit senses various inputs of a user and the environment of a portable device and may be then able to deliver the sensed result to the processor 17 in order for the processor to perform an operation according to the sensed result. The aforementioned sensors may be included in the device as a separate element or may be included in the device in a manner of being combined with at least one element.

Therefore, according to one embodiment, the sensor unit 15 can be situated at the expandable display and may sense a touch input signal of a user for the display. In particular, in case that the expandable display is divided more than two regions, the sensor unit may separately sense the touch input for each of displaying areas.

A touch sensing method may be differentiated according to the position of the sensor or the kind of sensor of the aforementioned sensor unit 15. And, the sensor unit may include all sensors capable of sensing a touch input and may be non-limited to a form of the aforementioned sensors.

The power unit 16 is a power source connected to a battery of the internal of the device or an external power supply. It is able to supply a power to the device.

The processor 17 executes various applications stored in the storage unit 10 and may process data of the internal of the device. And, the processor controls the units of the device and may manage data transmission and reception between the units. And, the processor 17 may control an output of the image displayed in the display.

And, according to one embodiment, in case that the aforementioned expandable display expands, the processor 17 may display an image according to a degree of expansion. More specifically, the processor may display the image according to the degree of expansion in a manner of adjusting the size of the image, a resolution and the like and may display a different image according to the size. And, the processor 17 also plays a role of controlling a display image, i.e., displaying an image in a display panel, giving an animation effect on the displayed image and the like.

And, according to one embodiment, the processor 17 recognizes a signal according to a user input delivered from the aforementioned sensor unit 15 as an input signal and may be then able to control a portable device according to the input signal. In other word, the processor 17 is able to detect an input signal via the measuring unit 12 or the sensor unit 15. In particular, the processor 17 may detect a signal occurred by the user input which is received from a specific sensor among many signals that the processor receives. For instance, if the sensor unit 15 senses a user input for the expandable display, the processor 17 may detect the input signal using the sensed result.

And, according to one embodiment, the processor 17 may control a locking of a portable device. In this case, the locking of the portable device may mean 1) the device operates differently from the intention of a user and 2) specific units of the device are deactivated to avoid unnecessary power consumption of the device. And, an unlocking of the portable device may mean that a user activates the deactivated specific units to use the device. Detailed contents about a method of controlling a locking of a portable device by the processor 17 shall be described in FIG. 4 to FIG. 9.

In the following description, if each step or operation performed in the portable device is started or proceeds by a user input, assume an input signal generating procedure according to the user input includes an explanation of the aforementioned procedure although it is not explained repeatedly. And, it may express that the processor controls the portable device or the units included in the portable device according to the user input and it may explain in a manner of equating the processor with the portable device.

Meanwhile, FIG. 1 is a block diagram according to one embodiment. Blocks represented in a manner of being separated indicate the logically distinguished elements of the device. Hence, the elements of the aforementioned device may be equipped with a single chip or a plurality of chips according to the design of the device.

FIG. 2a is a table explaining 3 kinds of modes capable of operating until a portable device is unlocked.

The device may be one mode among the 3 kinds of modes, which corresponds a locking mode, an unlocking standby mode, and an unlocking mode. And, the device may convert one mode to another mode among the 3 kinds of modes. The locking mode of the device is called a 1st mode, the unlocking standby mode of the device is called a 2nd mode, and the unlocking mode of the device is called a 3rd mode in the present specification.

The 1st mode corresponds to a status that an expandable display is not activated and at least one of a display and a sensor unit is deactivated. In the status of locking, a part of configuring elements of the device can be deactivated to avoid unnecessary power consumption and an incorrect operation, which is not corresponding to an intention of a user. Hence, in case of the locking status, the device may limitedly provide an application or content via an expandable display to some extent. A deactivated status may indicate a status that a power supply to the display or the sensor unit is cut off. Cutting off the power supply for the display may mean a case that no screen is displayed in the display since a light emitting display of the display is deactivated. Cutting off the power for the sensor unit may mean a status that a touch input cannot be detected in the display. In case that an unlocking triggering signal is detected in the 1st mode, the device may convert into the 2nd mode.

The 2nd mode corresponds to a standby status prior to the status that the device converts to the unlocking status. Similar to the 1st mode, the 2nd mode is the status prior to the status that the device provides application and content to a user via the expandable display without any restriction. Yet, unlike the 1st mode, at least one of the expandable display or the sensor unit can be activated. An active status may indicate a status that power is supplied to the display and the sensor unit. The status that power is supplied to the display may indicate a status that the device is able to display a currently executing screen in the display. And, the status that power is supplied to the sensor unit may indicate a status that a touch input can be sensed in the display. Meanwhile, an unlocking interface can be displayed in the expandable display. The unlocking interface can be provided by the device to detect an unlocking signal of a user according to one embodiment. Or, the unlocking interface can be provided by the device to guide the user how to input the unlocking signal. In this case, the device may enable the expandable display or the sensor unit to operate partially. The unlocking interface can be displayed in the expandable display as a graphic user interface and various animation effects can be provided according to an unlocking method. Detailed explanation on the unlocking interface shall be described in FIG. 2b. Meanwhile, if a user input is not detected in the 2nd mode for more than a prescribed time, the device may convert into the 1st mode.

The 3rd mode corresponds to an unlocking status of the device and the 3rd mode is a status that the expandable display and the sensor unit sensing a touch input signal are activated. The 3rd mode is an activated status of the device capable of providing application and content via the expandable display without any restriction. Hence, a user may freely use the device without a separate restriction in the 3rd mode. And, a pre-set standby screen or an executing screen of an application, which was executed before cutting off the power of the display, can be displayed in the expandable display in the 3rd mode. Meanwhile, if a user input is not detected in the 3rd mode for more than a prescribed time, the device may convert into the 1st mode.

Figure 2B:
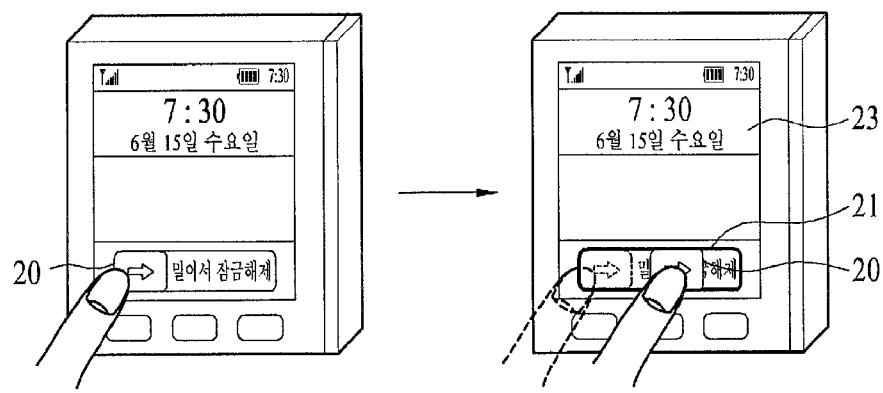
FIG. 2b is a diagram of a device displaying an unlocking interface according to one embodiment.
Figure 2B:
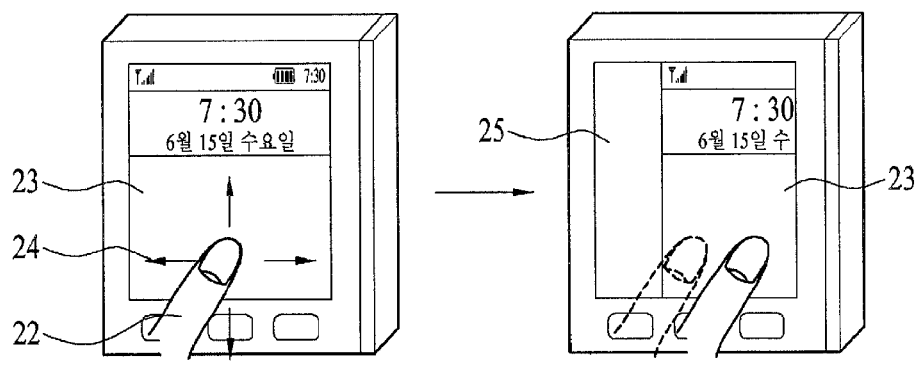
Figure 2B:
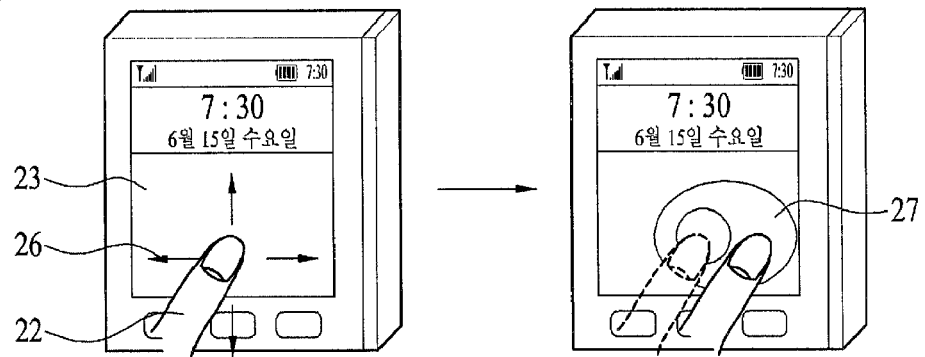

FIG. 2b is a diagram of a device displaying an unlocking interface 23 according to one embodiment. As mentioned in the above, since the unlocking interface 23 is displayed in the 2nd mode, the device shown in the diagram corresponds to the 2nd mode.

The unlocking interface 23 may include a user interface capable of being an indicator indicating an unlocking procedure of the device. And, the unlocking interface 23 may include a user interface capable of being an indicator guiding a user through a method of inputting an unlocking signal. A method of unlocking of the device using the unlocking interface 23 shall be described with reference to a diagram.

FIG. 2b-(1) is a diagram showing one embodiment of a device, which is unlocked if a consistent touch input pattern 22 corresponds to a pre-set pattern. According to one embodiment, an unlocking object 20 and an unlocking tab 21 can be displayed as a configuring element of the unlocking interface 23. A user may unlock a device by touching the unlocking object (hereinafter abbreviated object) 20 and by continuously moving the object 20 to the course of which the unlocking tab 21 guides as much as a pre-set length. The object 20 can be displayed by various images and the object is displayed by an arrow in the diagram as one embodiment. The unlocking tab 21 can be displayed by various images as well and the unlocking tab is displayed by a rectangle consisting of dotted lines in the diagram as one embodiment. The user may intuitively know an additional moving distance of the object for the unlocking via the unlocking interface 23. For instance, if the user moves the object 20 to a half region of the unlocking tab 21, the user may know that a locking of the device can be unlocked by moving the object as much as a half more. Hence, the unlocking interface 23 can be used as an indicator indicating an unlocking degree of the device and a remaining degree to unlock the device.

And, the device can be set to unlock if a distance of a straight line connecting a start point and an end point of the travel of the object 20 is greater than a prescribed distance. In particular, an unlocking of the device is enabled in a manner of using a travel length of the object 20 without a separate course configuration.

And, various animation effects can be given to the unlocking interface 23. The animation effects can be provided to 1) guide a method of unlocking the device or, 2) give a design effect. And, the animation effects may be variously provided in response to the travel of the object 20 and may be enabled by a configuration of a user.

FIG. 2b-(2) is also a diagram showing one embodiment of a device, which is unlocked if a consistent touch input pattern 22 corresponds to a pre-set pattern. More specifically, FIG. 2b-(2) is a diagram showing one embodiment of a device, which is unlocked if a distance of a straight line of a touch input pattern 20 is matched with a pre-set distance. In this case, the distance means a practical distance. Unlike the embodiment of FIG. 2b-(1), the unlocking object 20 may not be separately provided by the present embodiment. According to the present embodiment, a user may start a touch input in any place within the unlocking interface 22. If a straight line connecting a start point and an end point of a continuous touch input is greater than a threshold, the device can be unlocked. The unlocking interface can be displayed by various images. And, the unlocking interface 23 may or may not travel according to a touch pattern of the user. In case that the unlocking interface 23 travels, the unlocking interface may travel in various courses 24. Although the device providing the unlocking interface 23 travels from left to right is depicted only in the present embodiment, the unlocking interface may travel in such various courses 24 as right and left and top and bottom, a straight line, a diagonal line, a circle, a curve, and the like. Since the unlocking is controlled by a distance of a straight line connecting a start point and an end point of a touch in the present embodiment, a travel course of the unlocking interface 23 may not be determined. Since the unlocking interface 23 travels according to the touch input of a user, it may know a degree of the unlocking. It is because the user is able to know a travel length since the unlocking interface 23 travels according to the touch of the user. A screen resulted from converting to the 3rd mode of the device or a pre-set standby screen can be displayed in a margin area 25, which is generated according to the travel of the unlocking interface 23 in the display.

FIG. 2b-(3) is also a diagram showing one embodiment of a device, which is unlocked if a consistent touch input pattern 22 corresponds to a pre-set pattern. More specifically, FIG. 2b-(3) is a diagram showing one embodiment of a device, which is unlocked if a distance of a straight line of a touch input pattern 22 is matched with a pre-set distance. Yet, unlike the embodiment of FIG. 2b-(2), the unlocking interface 23 may not travel according to a touch pattern 22 of a user in the present embodiment. Instead, an animation effect 27 can be provided to the unlocking interface 23 in response to the touch input 22 of the user. For instance, the animation effect 27 such as a wave of a surface of water can be provided at the point of the user touch input. The wave may spread from the point of the user touch input as its center. Yet, the unlocking can be achieved in the present embodiment if the distance of the straight line of the touch input pattern is greater than a prescribed distance as shown in FIG. 2b-(2). There exists a difference in providing the animation effect 27 instead of traveling the unlocking interface. The animation effect 27 can be provided to 1) guide a method of unlocking the device or, 2) give a design effect. And, the animation effects 27 may be variously provided in response to the travel of the unlocking interface 23 and may be enabled by a configuration of a user.

The aforementioned unlocking interface 23 embodiments can be applied to various unlocking procedures of a device in the following description and may vary according to a structure of the device. The unlocking interface 23 in the following description is explained with reference to the aforementioned unlocking interface 23 described in FIG. 2b-(1) and a duplicated explanation on the unlocking interface 23 is omitted.

Figure 3:
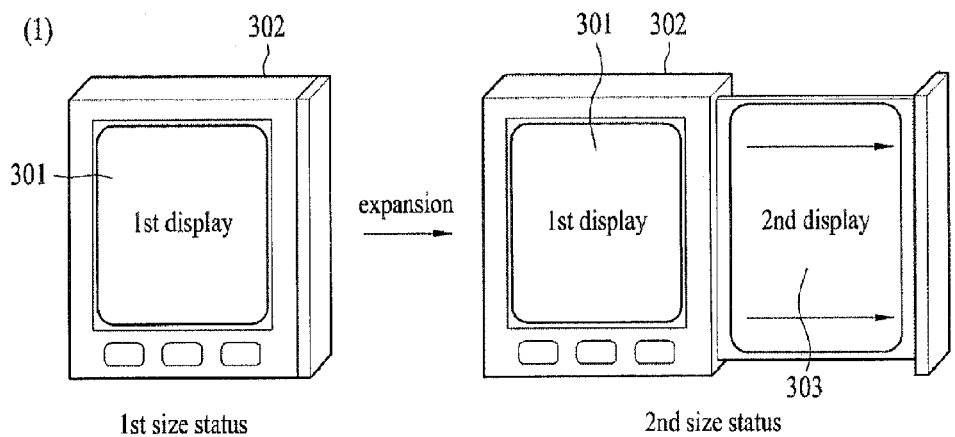
FIG. 3 is a diagram of a portable device equipped with an expandable display according to one embodiment.
Figure 3:
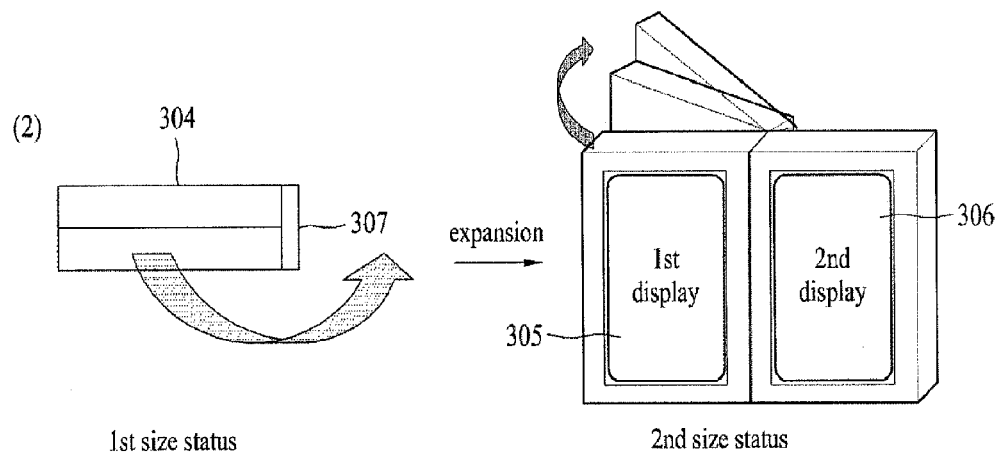
Figure 3:
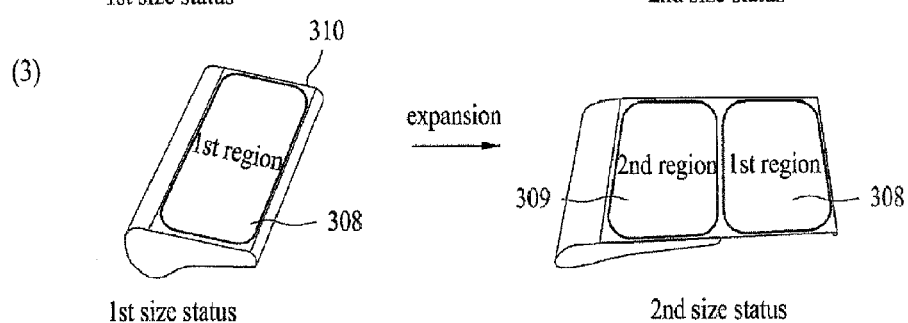
Figure 3:
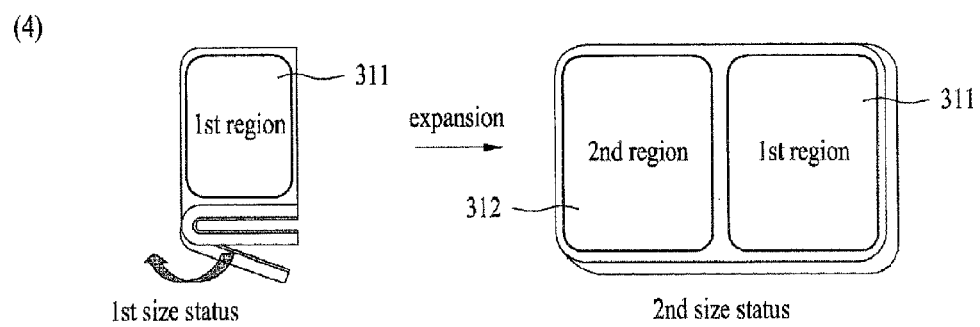

FIG. 3 is a diagram of various portable devices equipped with an expandable display according to one embodiment. The expandable display may be mounted to a device with a various forms according to a usage and a design. More specifically, the expandable display can be mounted to the device 302 with a main display 301 and a sub display 303. Or, the expandable display can be mounted to the device 304 with a plurality of displays 305/306 capable of being folded or unfolded. Or, the expandable display 307 can be mounted to the device with a flexible display capable of expanding its area or a length according to a necessity. Or, the expandable display 310 can be mounted to the device with a flexible display capable of being bent or unbent according to a necessity.

FIG. 3-(1) is a diagram of a portable device 302 equipped with an expandable display including a main display 301 and a sub display 303. More specifically, FIG. 3-(1) is a diagram showing an embodiment of the device 302 equipped with the expandable display including a 1st display 301 and a 2nd display 303. In this case, the expandable display 301/303 may be a flexible display or an inflexible display. According to the present embodiment, the 1st display 301 may correspond to the inflexible display and the 2nd display 303 may correspond to the flexible display. According to the present embodiment, expansion degree of the expandable display 301/303 can be determined on the basis of an expansion length of the 2nd display 303.

The 2nd display 303 can be stored in the device in a manner of being slide-in or rolled-in. The 2nd display can be used in a manner of being expanded from the device in case that a user is trying to use the 2nd display 303. In case that the 2nd display 303 is stored in the device by being slide-in, the user is able to expand the 2nd display 303 in a manner of sliding-out. In this case, a sliding unit can be mounted to the device to enable the 2nd display 303 to easily slide out from the device. The sliding unit 21 enables the 2nd display 303 to expand in a manner of sliding straightly. In case that the 2nd display 303 is stored in the device by being rolled-in, the user is able to expand the 2nd display 303 in a manner of rolling-out. The width of the 2nd display 303 may be larger than that of the main display. A housing unit storing the 2nd display 303 by rolling can be located within the device 302 or outside of the device 302 and may automatically expand the 2nd display 303 according to a control of the user.

According to the present embodiment, the expandable display may have at least one size status of a 1st size status and a 2nd size status. The 1st size status may indicate the size status of the expandable display 301/303 before the expandable display expands. More specifically, the 1st size status may indicate the size status of the expandable display before the 2nd display 303 is rolled out from the device or the size status of the expandable display before the 2nd display 303 is exposed to the outside. The 2nd size status may indicate the size status of the expandable display 301/303 in case that the expandable display has expanded. More specifically, the 2nd size status may indicate the size status of the expandable display in case that a part or whole of the 2nd display 303 is rolled out from the portable device 302 or exposed to the outside of the portable device 302. If the expandable device 301/303 has the 1st or the 2nd size status, the device 302 may be in one mode among the 1st to the 3rd mode.

FIG. 3-(2) is a diagram showing an embodiment of a portable device 304 equipped with an expandable display including a plurality of displays 305/306 according to one embodiment. According to the present embodiment, the expandable display can be configured with a 1st display 305, a 2nd display 306, and a connecting unit 307 connecting each of the displays. The expandable display may expand by unfolding the 1st display 306 from the 2nd display 305 with the connecting unit as its center. Or, the expandable display may being reduced by folding the 1st display 305 to the 2nd display 306 with the connecting unit as its center. The 1st and the 2nd display 305/306 may be a flexible or an inflexible display. In the present embodiment, the inflexible display 305/306 is explained as an example and may be non-limited to the present embodiment. According to the present embodiment, expansion degree of the expandable display 305/306 can be determined on the basis of a folding angle of the 1st display 305 and the 2nd display 306.

The connecting unit 307 is a configuring element connecting the 1st display 305 and the 2nd display 306. The connecting unit may include such various embodiments capable of connecting two displays as a hinge, a slide hinge, and the like. And, the connecting unit 307 is configured to enable the location of the 1st display 305 and the 2nd display 306 to be changed. In particular, the 1st display 305 and the 2nd display can be configured to travel to left, right, top, and bottom or be folded in a manner of overlapping one upon another in a condition of being connected with each other. For instance, in case that the connecting unit 307 is configured with a hinge, each of the displays can be configured to overlap with the hinge as its center. In case that the displays overlapped with the hinge as its center, the back of each display may be folded to face each other. Or, the front of each display can be folded to face each other. In case that the back of the display is folded to face each other, the screen of each display may face a user. The present embodiment is explained on the basis of the expandable display facing the back of each display each other. Yet, a connection form between the 1st and the 2nd display may be non-limited to this. And, although the connecting unit 307 is depicted in the diagram as connecting each display in a manner of being attached to a horizontal side of each display, the connecting unit 307 can be attached to a vertical side of each display and may be non-limited to the above mentioned embodiment. The connecting unit 307 detects an expansion of the expandable display and can be configured in a manner of including a measuring unit configured to measure a degree of the expansion. More specifically, in case that the expandable display expands with a hinge as its center, the connecting unit can be configured in a manner of including the measuring unit capable of measuring an angle formed by each display. The angle measuring method of the measuring unit is aforementioned in FIG. 1.

According to the present embodiment, the expandable display may have a 1st size status and a 2nd size status. The 1st size status may indicate the size status of the expandable display before the expandable display expands. More specifically, the 1st size status may indicate the size status of the expandable display in case that the 1st display 305 is folded to the 2nd display 306 or the size status in case that the 1st display 305 and the 2nd display 306 are folded with the connecting unit as its center. The 2nd size status may indicate the size status of the expandable display in case that the expandable display expands. More specifically, the 2nd size status may indicate the size status of the expandable display in case that the 1st display 305 is unfolded from the 2nd display 306 or the 1st display 305 and the 2nd display 306 are unfolded with the connecting unit as its center. If the expandable display 305/306 has the 1st or the 2nd size status, the device 304 may be in one mode among the 1st to the 3rd mode.

FIG. 3-(3) is a diagram showing an embodiment of a portable device 310 equipped with an expandable display 308/309 capable of expanding its area or a length. According to the present embodiment, the device 310 can be configured with one expandable display 308/309 and a housing unit storing the expandable display 308/309 in a manner of rolling. The expandable display 308/309 in the present embodiment may be an flexible display. In the present embodiment, the degree of expansion can be determined on the basis of an area or length of which the 2nd display area 309 expands.

The expandable display 308/309 can be stored in the housing unit located at the inside of the device 310 in a manner of being rolled in. The expandable display 308/309 stored in the housing unit may expand by a user or automatically. In this case, the expansion may mean that the expandable display 308/309 is exposed to the outside of the device 310 in a manner of being rolled out. Hence, a user may control the expansion length or area of the expandable display according to a necessity. The expandable display 308/309 may expand to various directions or by methods according to the position of the housing unit or a method of housing. According to whether the expandable display is rolled-in or rolled-out, the expandable display 308/309 can be divided into a 1st region 308 and a 2nd region 309. More specifically, in case that the expandable display 308/309 is rolled in the housing unit completely, the display area exposed to the outside of the device 310 may be called the 1st region 308. And, in case that the expandable display 308/309 is rolled out, the display area displayed to a user except the aforementioned 1st region 308 may be called a 2nd region 309. Hence, the width or area of the 2nd region 309 may change according to the degree of expansion of the expandable display 308/309. Yet, the width or area of the 1st region 308 may not change.

Meanwhile, the housing unit can be configured in a manner of including a measuring unit configured to measure a degree of expansion of the expandable display 308/309. In this case, the degree of expansion can be determined on the basis of a length or area of which the expandable display 308/309 expanded from the device. The length measuring method by the measuring unit is aforementioned in FIG. 1. And, the device 310 may further include a sliding unit enabling the expandable device 308/309 to slide straightly.

According to the present embodiment, the expandable display 308/309 may have a 1st size status and a 2nd size status. The 1st size status may indicate the size status of the expandable display before the expandable display 308/309 expands. More specifically, the 1st size status may indicate the size status of the expandable display in case that only the display of the 1st region 308 is exposed to the outside of the device 310 or the display of the 2nd region 309 is not exposed to the outside of the device 310 since the display of the 2nd region is not rolled out. The 2nd size status may indicate the size status of the expandable display in case that the expandable display 308/309 has expanded. More specifically, the 2nd size status may indicate the size status of the expandable display in case that the display of the 2nd region 309 is exposed to the outside of the device 310 since the display is rolled out from the device 310.

FIG. 3-(4) is a diagram of a device equipped with an expandable display 311/312 capable of being bent or unbent. In particular, since the expandable display is possible to be bent or unbent, the expandable display 311/312 may mean a flexible display in this case. According to the present embodiment, the expandable display 311/312 can be configured with one flexible display. And, according to the present embodiment, a degree of expansion of the expandable display 311/312 can be determined on the basis of a bending angle.

According to the present embodiment, since the expandable display 311/312 is capable of being bent, the expandable display can be called a bendable display. The expandable display 311/312 can be divided into a plurality of display regions based on the number of bending. For instance, in case that the expandable display bends twice based on the boundary lines different from each other, the display 311/312 can be divided into a 1st region to a 3rd region based on the bending boundary lines. The present embodiment shows an expandable display divided into a 1st region 311 and a 2nd region 312 based on a bending boundary line in case that a bending is achieved based on a prescribed one boundary line. In this case, a screen currently watched by a user may be called as the 1st region 311. The 2nd region 312 may be a display region except the 1st region 311. And, the bending of an expandable display can be achieved based on various boundary lines. Hence, the area of each of the regions divided by the various boundary lines may vary. Although the present embodiment indicates a case that a bending is performed on the point where the area of the 1st region and the area of the 2nd region are same, it may be non-limited to the case.

According to the present embodiment, the expandable display may have a 1st size status and a 2nd size status. The 1st size status may indicate the size status of the expandable display before the expandable display 311/312 expands. More specifically, the 1st size status may indicate the size status of the expandable display in case that the 1st display 311 overlapped the 2nd display 312 in a manner of being bent. The 2nd size status may indicate the size status of the expandable display in case that the expandable display 311/312 expands. More specifically, the 2nd size status may indicate the size status in case that the expandable display 311/312 is being unbent. Or, the 2nd size status may indicate the size status in case that a bending angle, which is formed by the display containing the 1st region 311 and the display containing the 2nd region 312, is not '0' in a manner of being unbent the expandable display 311/312.

In the foregoing description, various devices equipped with an expandable display are explained in detail. Since an unlocking method varies according to a kind and a mounting method of the expandable display, the unlocking method according to each apparatus is described in the following.

Figure 4A:
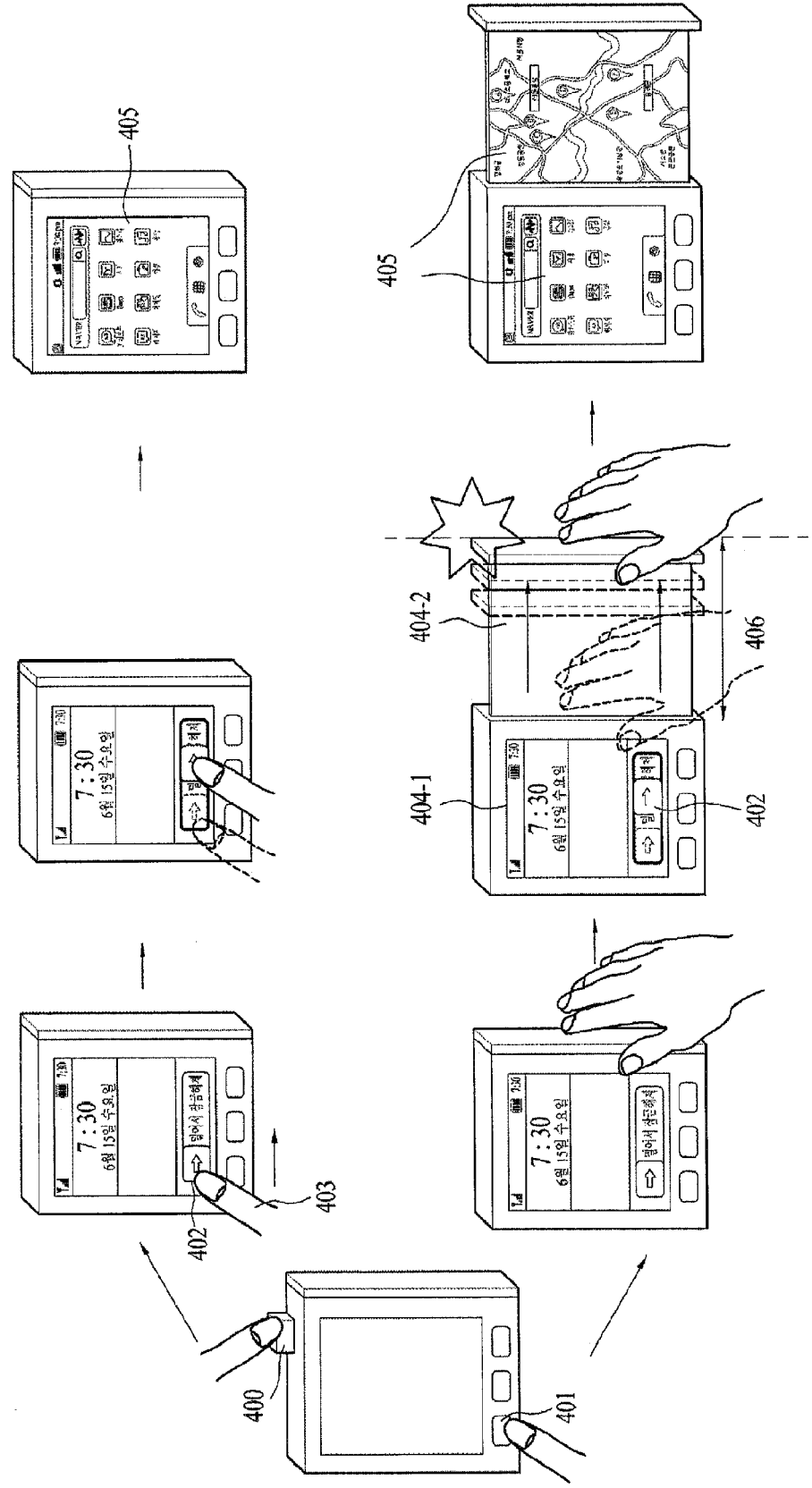
FIG. 4a is a diagram of a device showing a procedure of converting to a 3rd mode according to one embodiment.

FIG. 4a is a diagram of a device showing a procedure of converting to a 3rd mode according to one embodiment. In particular, the device in FIG. 4 indicates the device that an expandable display 404-1/404-2 is equipped with a main display (hereinafter abbreviated a 1st display) 404-1 and a sub display (hereinafter abbreviated a 2nd display) 404-2.

First of all, a device may convert a mode by a touch input 403. And, the device may convert a mode by a degree of expansion of an expandable display 404-1/404-2. In particular, the device may convert a mode by two methods, i.e., the touch input 403 and the degree of expansion of the display 404. According to the present embodiment, the degree of expansion of the expandable display 404-1/404-2 can be determined based on an expansion length 406 of the expandable display 404-1/404-2. Specifically, the degree of expansion can be determined based on the expansion length 406 of the 2nd display 404-2 expanded from the device.

A mode converting procedure of the device is described in detail. First of all, the device of the 1st mode may convert into the 2nd mode by an unlocking triggering signal 400/401. The unlocking triggering signal 400/401 may include such a various signal as a power supply signal 400 to the display 404-1/404-2, a signal transmitted by pushing a button 400/401 equipped with the device, a signal transmitted according to an expansion of the expandable display 404-1/404-2, and the like.

In case that the device converts to the 2nd mode by the unlocking triggering signal 400/401, a display and a sensor unit can be activated. And, an unlocking interface 402 can be displayed in the expandable display 404-1/404-2. The unlocking interface 402 can be displayed in at least one of the 1st display 404-1 and the 2nd display 404-2.

The device may convert into a 3rd mode by a touch input for the unlocking interface 402. More specifically, in case that the touch input for the unlocking interface 402 is detected, the device may recognize a touch input pattern from a detected input signal. If the recognized touch input pattern is matched with a pre-set pattern, the device may convert into the 3rd mode 405. In this case, the unlocking interface travels to a pre-set course according to the touch input of the user or an animation effect can be provided according to the touch pattern. Detailed content about a method of converting to the 3rd mode by the touch input is same with the content aforementioned in FIG. 2b-1.

And, the device may convert into the 3rd mode 405 by an expansion of the expandable display 404-1/404-2. More specifically, in case that a length 406 of the 2nd display 404-2 expanded from the device is greater than a threshold, the device may convert into the 3rd mode 405. In this case, in order for the device to unlock, the device may use identical unlocking interface according to 1) a touch input and 2) the expansion of the expandable display. As one embodiment, in case that the unlocking interface 402 travels to a pre-set course by a touch input, the unlocking interface 402 may travel to the same course by the expansion of the display as well. For instance, in case that an unlocking object 402 corresponds to the unlocking interface 402, which travels to the pre-set course according to the touch input, the unlocking object 402 may travel to the pre-set course according to the expansion of the display as well. As a different embodiment, in case of unlocking by a straight line distance of the touch input pattern, the effect provided to the unlocking interface 402 by the expansion of the display can be displayed in a same manner. Yet, a starting point of the effect may be different from each other. For instance, in case that an animation effect such as a wave on the surface of water is provided according to the touch input pattern 403, an identical animation effect can be provided according to the expansion of the display. The animation effect such as the wave of the surface of water starts from a first touch input point in case of the touch input, whereas the animation effect may start from the middle of the 1st display 404-1 in case of the expansion of the 2nd display 404-2. The starting point of the effect can be variously configured by a user. It is not mandatory for the starting point to be fixed and may flexibly change on every expansion of the display. In case that a touch input signal and an expansion signal of the expandable display are detected at the same time in the 2nd mode of the device, the device may process the expansion signal of the expandable display prior to the touch input signal. Or the device may process the touch input signal prior to the expansion signal as well. The priority can be configured by a user.

As mentioned in the foregoing description, by using a same or similar user interface for different input methods, i.e., a touch by a user and an expansion of a display, there may exist a merit in that it may provide the user with more intuitive and unified unlocking method.

Figure 4B:
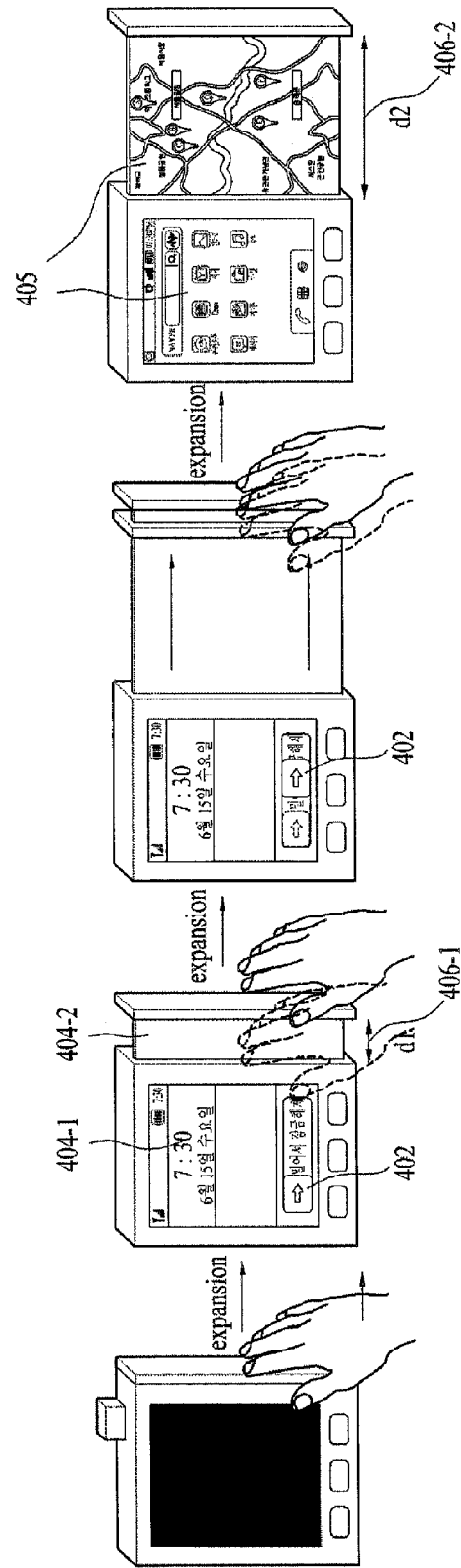
FIG. 4b is a diagram of a device indicating that an unlocking triggering signal corresponds to an expansion signal of an expandable display according to one embodiment.

FIG. 4b is a diagram of a device indicating that an unlocking triggering signal corresponds to an expansion signal of an expandable display 404-1/404-2 according to one embodiment.

The device may have a 1st size status, which is the size status before the 2nd display 404-2 expands. And, the device may have a 2nd size status, which is the size status after the 2nd display 404-2 expanded. The device may be in one mode among the 1st to 3rd mode in the 1st and 2nd size status.

In case that an unlocking triggering signal is detected in the 1st mode, the device may convert into the 2nd mode. As mentioned in the foregoing description, the unlocking triggering signal may include such a various signal as a power supply signal 400 to the display 404-1/404-2, a signal transmitted by pushing a button 400/401 equipped with the device, a signal transmitted according to an expansion of the expandable display 404-1/404-2, and the like. According to the present embodiment, the unlocking triggering signal may correspond to a signal transmitted as the expandable display 404-1/404-2 expands more than a specific length. In this case, the unlocking triggering signal may correspond to the signal transmitted in case that the 2nd display 404-2 expands more than a 1st length 406-1 from the device. In case that the 2nd display 404-2 expands more than the 1st length 406-1, an expansion signal is transmitted to the device and the device may be then able to convert from the 1st mode to the 2nd mode according to the expansion signal. An unlocking interface 402 can be displayed when the device is in the 2nd mode. Moreover, the device may convert into the 3rd mode 405 according to a touch input or an additional expansion of the expandable display 404-1/404-2 from the 2nd mode. In other word, in case that the mode of the device is converted according to the expansion of the expandable display and the display expands more than the 2nd length 406-2, the device may convert to the 3rd mode 405. In this case, the 2nd length may be longer than the 1st length 406-1. And, the 2nd length 406-2 may be same or shorter than a maximum expansion length of the 2nd display 404-2.

FIG. 5a is a diagram of a device showing a procedure of converting to a 3rd mode according to one embodiment. In particular, FIG. 5 indicates the device equipped with a plurality of displays capable of being folded or unfolded. In case that the display is folded with a connecting unit as its center, the display currently facing a user is called a 1st display 505-1 and a separate display connected to the 1st display 505-1 is called a 2nd display 505-2.

First of all, the device may convert a mode by a touch input 501. And, the device may convert the mode by an expansion degree of the expandable display. In particular, the device may convert the mode by two methods, i.e., the touch input 501 and the degree of expansion of the display. According to the present embodiment, the degree of expansion of the expandable display can be determined based on a folding angle of the expandable display. Specifically, the degree of expansion can be determined based on the folding angle formed by an extension line of the 1st display 505-1 and the extension line of the 2nd display 505-2.

The mode converting procedure of the device is described in detail. First of all, the device of the 1st mode may convert into the 2nd mode by an unlocking triggering signal. The unlocking triggering signal may include such a various signal as a power supply signal 500 to the display, a signal 500 transmitted by pushing a button equipped with the device, a signal transmitted according to an expansion of the expandable display, and the like. The present embodiment selects the signal 500 transmitted by pushing a button equipped with the device as the unlocking triggering signal. Yet, the unlocking triggering signal may be non-limited to the present embodiment and may include various signals as mentioned earlier.

In case that the device converts into the 2nd mode by the unlocking triggering signal, an unlocking interface 502 can be displayed in the expandable display. The unlocking interface 502 can be displayed at least one of the 1st display 505-1 and the 2nd display 505-2.

The device may convert from the 2nd mode to the 3rd mode 503 by the expansion of the expandable display. More specifically, in case a folding angle formed by the 1st display 505-1 and the 2nd display 505-2 is greater than a threshold 504, the device may convert to the 3rd mode. In this case, in order for the device to unlock, the device may use identical unlocking interface 502 according to 1) a touch input 501, 2) the expansion 504 of the expandable display. As one embodiment, the unlocking interface 502 may travel to a pre-set course by the touch input 501. In this case, the unlocking interface 502 may travel to the same course by the folding of the display as well. For instance, in case that an unlocking object 502 corresponds to the unlocking interface 502, which travels to the pre-set course according to the touch input pattern 501, the unlocking object may travel to the pre-set course according to the folding of the display as well. As a different embodiment, in case of unlocking by a straight line distance of the touch input 501 pattern, the effect provided to the unlocking interface 502 by the expansion of the display can be displayed in a same manner. Yet, a starting point of the effect may be different from each other. For instance, in case that an animation effect such as a wave on the surface of water is provided according to the touch input 501 pattern, an identical animation effect can be provided according to the expansion of the display. The animation effect such as the wave of the surface of water starts from a first touch input point in case of the touch input 501, whereas the animation effect may start from the middle of the 1st display 505-1 in case of the folding of the display. The starting point of the effect can be variously configured by a user. It is not mandatory for the starting point to be fixed and may flexibly change on every expansion of the display.

In case that a touch input signal and an expansion signal of the expandable display are detected at the same time in the 2nd mode of the device, the device may process the expansion signal of the expandable display prior to the touch input signal. Or the device may process the touch input signal prior to the expansion signal as well. The priority can be configured by a user.

As mentioned in the foregoing description, by using a same or similar user interface for different input methods, i.e., a touch 501 by a user and a folding of a display, there may exist a merit in that it may provide the user with more intuitive and unified unlocking method.

Figure 5B:
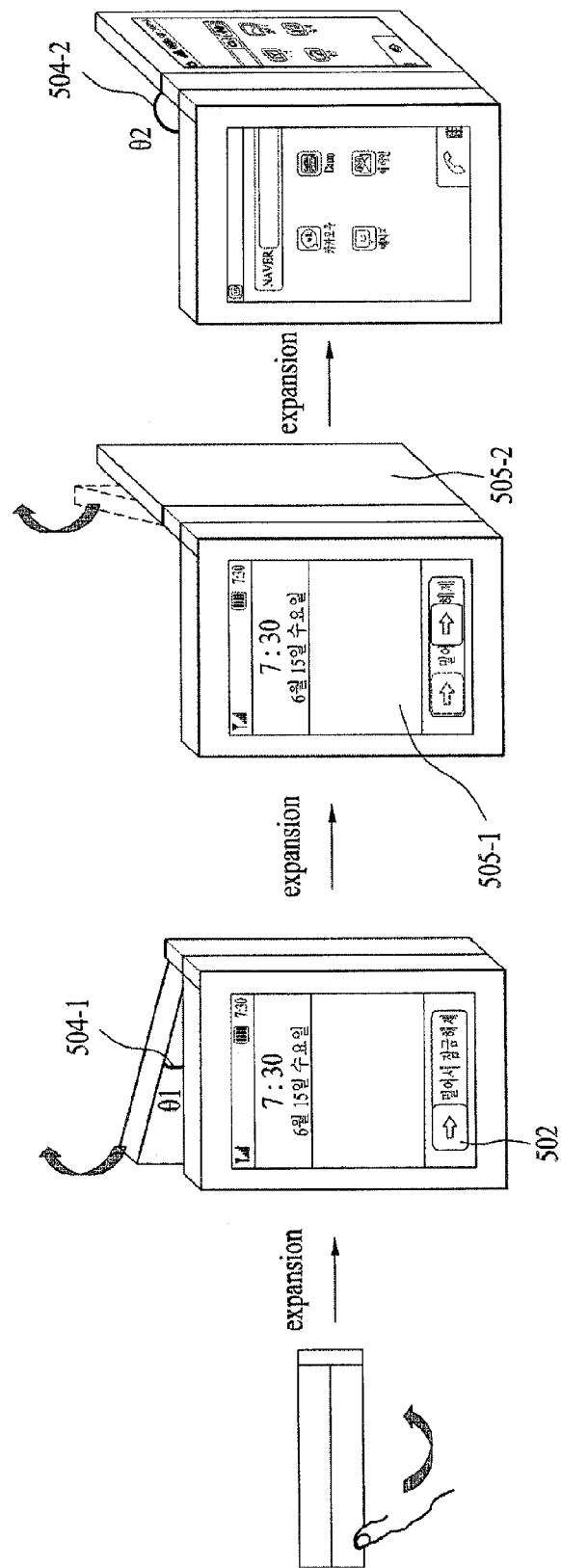
FIG. 5b is a diagram of a device indicating that an unlocking triggering signal corresponds to an expansion signal of an expandable display according to one embodiment.

FIG. 5b is a diagram of a device indicating that an unlocking triggering signal corresponds to an expansion signal of an expandable display according to one embodiment.

The device may have a 1st size status, which is a size status corresponding to a case that an angle formed by the 1st display 505-1 and the 2nd display 505-2 is '0'. And, the device may have a 2nd size status, which is a size status corresponding to a case that an angle formed by the 1st display 505-1 and the 2nd display 505-2 is not '0'. In this case, the angle may mean a practical angle. The device may be in one mode among the 1st to 3rd mode 503 in the 1st and 2nd size status.

In case that the unlocking triggering signal is detected in the 1st mode, the device may convert into the 2nd mode. The unlocking triggering signal, as mentioned in the above, may include such a various signal as a power supply signal to the display, a signal transmitted by pushing a button equipped with the device, a signal transmitted according to an expansion of the expandable display, and the like. According to the present embodiment, the unlocking triggering signal may correspond to the signal transmitted according to an unfolding of the expandable display, which expands more than a threshold 504-1. The threshold may mean a specific folding angle 504-1 formed by the 1st display 505-1 and the 2nd display 505-2. In this case, the unlocking triggering signal may correspond to the signal transmitted in case that the folding angle formed by the 1st display 505-1 and the 2nd display 505-2 is greater than a 1st angle 504-1. It may be natural to see that unfolding the expandable display more than a prescribed angle may correspond to the intention of a user who is trying to use the 2nd display 505-2. Hence, if the display is unfolded, the device may convert from the 1st mode to the 2nd mode. Additionally when the touch input signal is detected or the expandable display is unfolded supplementally, the device may be converted from 2nd mode to 3rd mode 503. In case that the device converts according to the expansion of the expandable display, if the display is unfolded more than a 2nd angle 504-2, the device may convert to the 3rd mode 503. In this case, the 2nd angle 504-2 may be greater than the 1st angle 504-1. And, the 2nd angle 504-2 may be same or smaller than 180°.

Figure 6A:
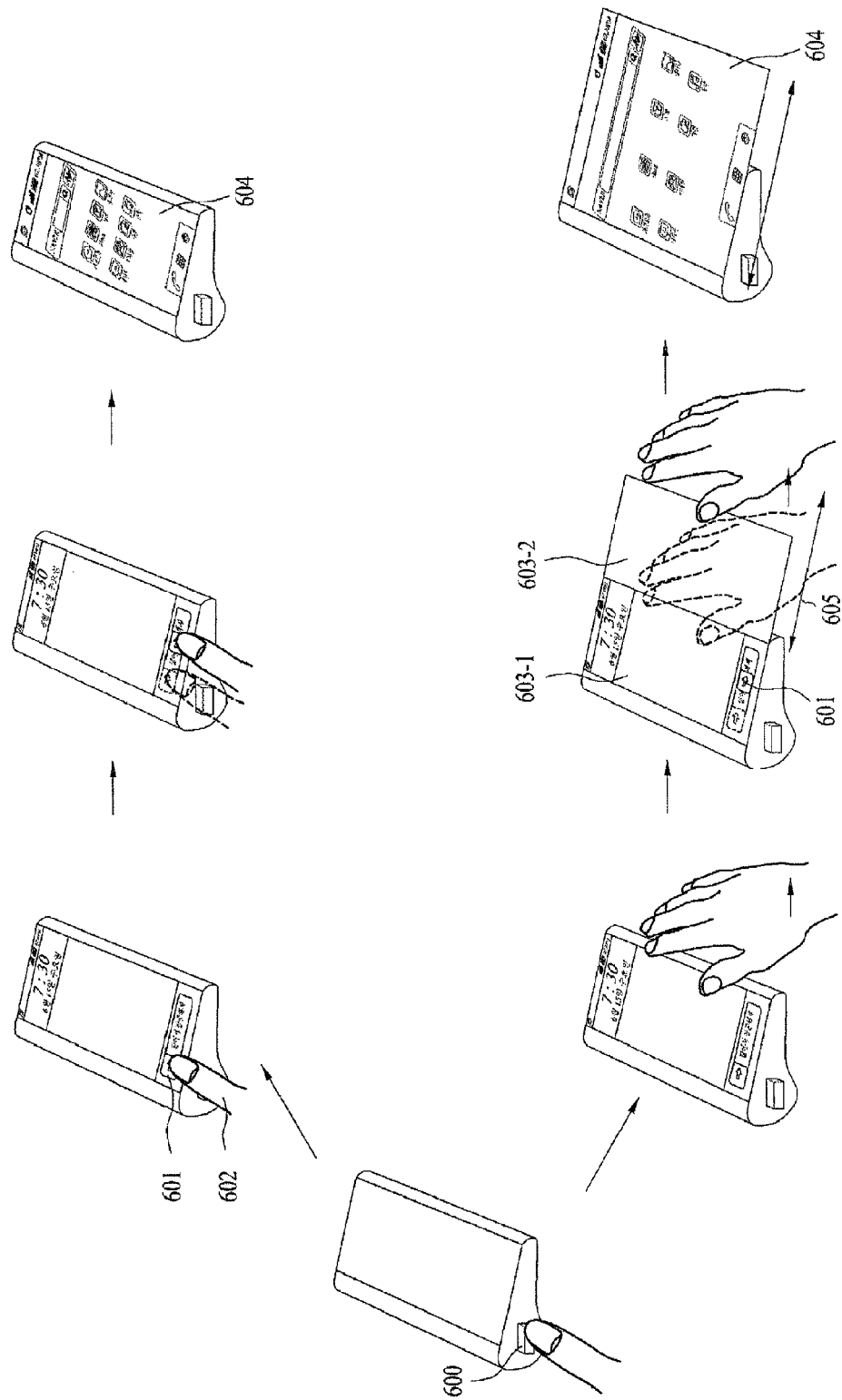
FIG. 6a is a diagram of a device showing a procedure of converting to a 3rd mode according to one embodiment.

FIG. 6a is a diagram of a device showing a procedure of converting to a 3rd mode 604 according to one embodiment. In particular, the device in FIG. 6 indicates a device stored one expandable display in a manner of rolling in. the expandable display can be divided into a 1st region 603-1 and a 2nd region 603-2 according to whether the expandable display is rolled-in or rolled-out from the device. More specifically, in case that the expandable display is rolled in a housing unit, a display region facing a user may be called the 1st region 603-1. And, in case that the expandable display is rolled out, the display region facing the user except the 1st region 603-1 may be called the 2nd region 603-2.

First of all, a device may convert a mode by a touch input 602. And, the device may convert a mode by a degree of expansion of an expandable display. In particular, the device may convert a mode by two methods, i.e., the touch input 602 and the degree of expansion of the display. According to the present embodiment, the degree of expansion of the expandable display can be determined based on an expansion length of the expandable display. Specifically, the degree of expansion can be determined based on the expansion length or area of the 2nd region 603-2.

A mode converting procedure of the device is described in detail. First of all, the device of the 1st mode may convert into the 2nd mode by an unlocking triggering signal. The unlocking triggering signal may include such a various signal as a power supply signal 600 to the display, a signal transmitted by pushing a button 600 equipped with the device, a signal transmitted according to an expansion of the expandable display, and the like. The present embodiment selects the signal transmitted by pushing a button 600 equipped with the device as the unlocking triggering signal. Yet, the unlocking triggering signal may be non-limited to the present embodiment and may include various signals as mentioned earlier.

In case that the device converts into the 2nd mode by the unlocking triggering signal, an unlocking interface 601 can be displayed in the expandable display. The unlocking interface 601 can be displayed at least one of the 1st region 603-1 and the 2nd region 603-2. Or, the unlocking interface 601 is displayed in the 1st region and may be contiguously displayed in the 2nd region 603-2 in a manner of being expanded according to the expansion degree of the display.

The device may convert from the 2nd mode to the 3rd mode 604 by the expansion of the expandable display. More specifically, in case the width of the 2nd region 603-2 is greater than a threshold 605, the device may convert to the 3rd mode 604. In this case, in order for the device to unlock, the device may use identical unlocking interface 601 according to 1) a touch input 602, 2) the expansion of the expandable display. As one embodiment, the unlocking interface 601 may travel to a pre-set course by the touch input 602. In this case, the unlocking interface 601 may travel to the same course by the expansion of the display as well. For instance, in case that an unlocking object corresponds to the unlocking interface 601, which travels to the pre-set course according to the touch input pattern 602, the unlocking object may travel to the pre-set course according to the expansion of the display as well. As a different embodiment, in case of unlocking by a straight line distance of the touch input 602 pattern, the effect provided to the unlocking interface 601 by the expansion of the display can be displayed in a same manner. Yet, a starting point of the effect may be different from each other. For instance, in case that an animation effect such as a wave on the surface of water is provided according to the touch input 602 pattern, an identical animation effect can be provided according to the expansion of the display. The animation effect such as the wave of the surface of water starts from a first touch input 602 point in case of the touch input 602, whereas the animation effect may start from the middle of the 1st region 603-1 in case of the expansion of the width of the 2nd region 603-2. The starting point of the effect can be variously configured by a user. It is not mandatory for the starting point to be fixed and may flexibly change on every expansion of the display.

In case that a touch input signal and an expansion signal of the expandable display are detected at the same time in the 2nd mode of the device, the device may process the expansion signal of the expandable display prior to the touch input signal. Or the device may process the touch input signal prior to the expansion signal of the expandable display. The priority can be configured by a user. As mentioned in the foregoing description, by using a same or similar user interface for different input methods, i.e., a touch by a user and an expansion of a display, there may exist a merit in that it may provide the user with more intuitive and unified unlocking method.

Figure 6B:
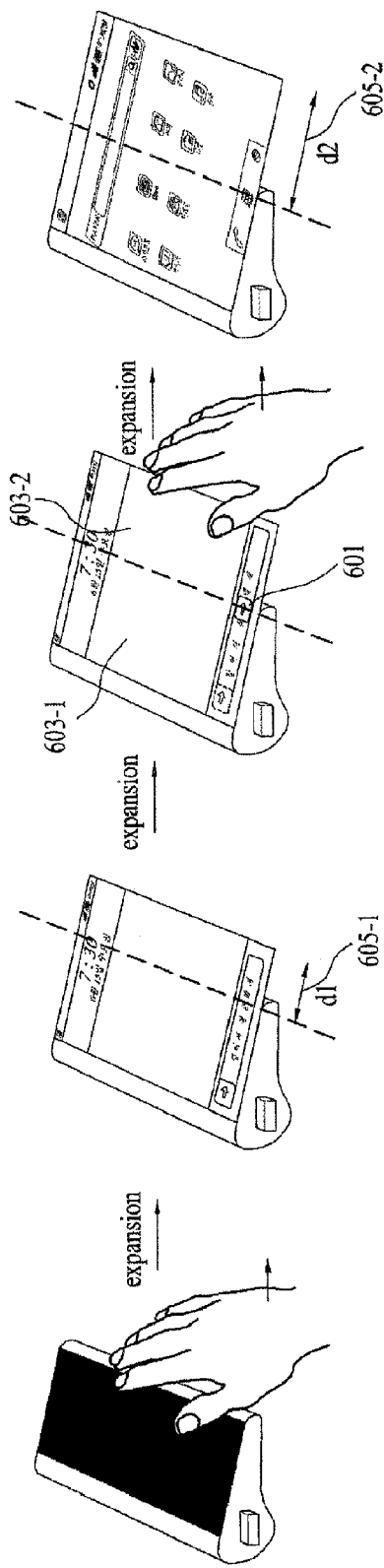
FIG. 6b is a diagram of a device indicating that an unlocking triggering signal corresponds to an expansion signal of an expandable display according to one embodiment.

FIG. 6b is a diagram of a device indicating that an unlocking triggering signal corresponds to an expansion signal of an expandable display according to one embodiment.

The device may have a 1st size status, which is the size status before the expandable display expands. In this case, the display region facing to a user corresponds to a 1st region 603-1. And, the device may have a 2nd size status, which is the size status after the expandable display expanded. In the 2nd size status, the display region except the 1st region 603-1 can be called a 2nd region 603-2.

In case that the unlocking triggering signal is detected in the 1st mode, the device may convert into the 2nd mode. The unlocking triggering signal, as mentioned in the above, may include such a various signal as a power supply signal to the display, a signal transmitted by pushing a button equipped with the device, a signal transmitted according to an expansion of the expandable display, and the like. According to the present embodiment, the unlocking triggering signal may correspond to the signal transmitted according to an expansion of the expandable display, which expands more than a specific length. In this case, the unlocking triggering signal may correspond to the signal transmitted in case that the expandable display expands more than a 1st length 605-1. It may be natural to see that the expansion of the expandable display, which expands more than a prescribed length, may correspond to the intention of a user who is trying to use the 2nd region 603-2. Hence, if the display expands more than the 1st length 605-1, the device may convert from the 1st mode to the 2nd mode. Moreover, the device may convert into the 3rd mode 604 according to a touch input 602 or an additional expansion of the expandable display from the 2nd mode. In case that the mode of the device is converted according to the expansion of the expandable display and the display expands more than the 2nd length 605-2, the device may convert into the 3rd mode 604. In this case, the 2nd length 605-2 may be longer than the 1st length 605-1. And, the 2nd length may be same or smaller than a maximum width of the 2nd region.

Figure 7A:
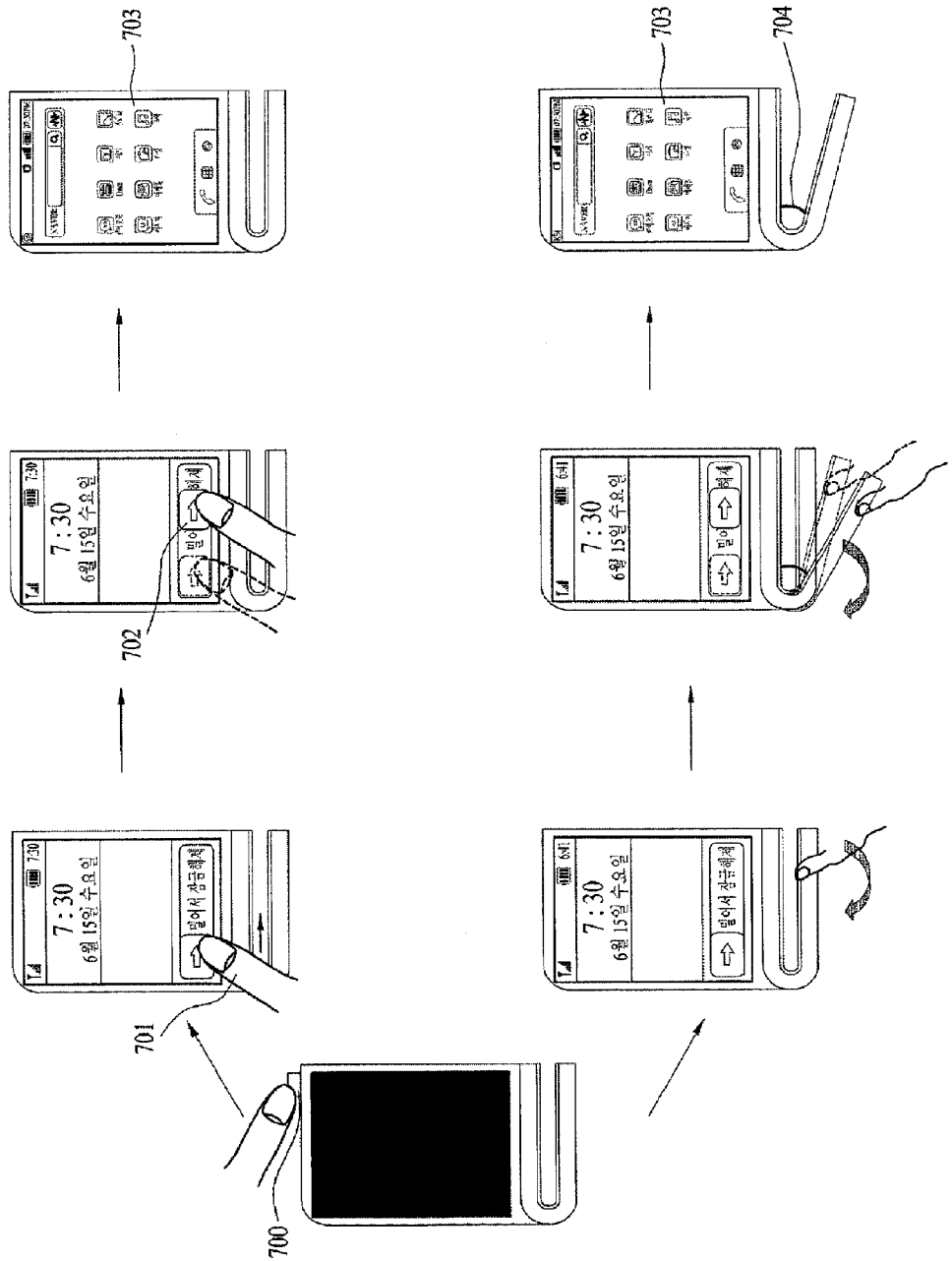
FIG. 7a is a diagram of a device showing a procedure of converting to a 3rd mode according to one embodiment.

FIG. 7a is a diagram of a device showing a procedure of converting to a 3rd mode 703 according to one embodiment. In particular, the device in FIG. 7 indicates a device equipped with one expandable display capable of being bent or unbent. The present embodiment is explained based on the expandable display, which is bent one time. In case that the expandable display is bent, a display region currently facing a user may be called a 1st region and the display region except the 1st region may be called a 2nd region.

First of all, the device may convert a mode by a touch input 701. And, the device may convert the mode by an expansion degree of the expandable display. In particular, the device may convert the mode by two methods, i.e., the touch input 701 and the degree of expansion of the display. According to the present embodiment, the degree of expansion of the expandable display can be determined based on a bending angle of the expandable display. Specifically, the degree of expansion can be determined based on the angle formed by an extension line of the 1st region and the extension line of the 2nd region.

The mode converting procedure of the device is described in detail. First of all, the device of the 1st mode may convert into the 2nd mode by an unlocking triggering signal. The unlocking triggering signal may include such a various signal as a power supply signal 700 to the display, a signal 700 transmitted by pushing a button equipped with the device, a signal transmitted according to an expansion of the expandable display, and the like. The present embodiment selects the signal transmitted by pushing a button 700 equipped with the device as the unlocking triggering signal. Yet, the unlocking triggering signal may be non-limited to the present embodiment and may include various signals as mentioned earlier.

In case that the device converts into the 2nd mode by the unlocking triggering signal, an unlocking interface 702 can be displayed in the expandable display. The unlocking interface 702 can be displayed at least one of the 1st region and the 2nd region. Or, the unlocking interface 702 is displayed in the 1st region and may be contiguously displayed in the 2nd region in a manner of being expanded according to the expansion degree of the display.

The device may convert from the 2nd mode to the 3rd mode 703 by the expansion of the expandable display. More specifically, in case a bending angle formed by the display including the 1st region and the 2nd region is greater than a threshold 704, the device may convert to the 3rd mode 703. In this case, in order for the device to unlock, the device may use identical unlocking interface 702 according to 1) a touch input 701, 2) the expansion of the expandable display. As one embodiment, the unlocking interface 702 may travel to a pre-set course by the touch input 701. In this case, the unlocking interface 702 may travel to the same course by the bending of the display as well. For instance, in case that an unlocking object corresponds to the unlocking interface 702, which travels to the pre-set course according to the touch input pattern 701, the unlocking object may travel to the pre-set course according to the bending of the display as well. As a different embodiment, in case of unlocking by a straight line distance of the touch input 701 pattern, the effect provided to the unlocking interface 702 by the expansion of the display can be displayed in a same manner. Yet, a starting point of the effect may be different from each other. For instance, in case that an animation effect such as a wave on the surface of water is provided according to the touch input 701 pattern, an identical animation effect can be provided according to the expansion of the display. The animation effect such as the wave of the surface of water starts from a first touch input 701 point in case of the touch input 701, whereas the animation effect may start from the middle of the 1st display in case of the bending of the display. The starting point of the effect can be variously configured by a user. It is not mandatory for the starting point to be fixed and may flexibly change on every unbending of the display In case that a touch input signal and an expansion signal of the expandable display are detected at the same time in the 2nd mode of the device, the device may process the expansion signal of the expandable display prior to the touch input signal. Or the device may process the touch input signal prior to the expansion signal of the expandable display. The priority can be configured by a user.

As mentioned in the foregoing description, by using a same or similar user interface for different input methods, i.e., a touch by a user and a bending of a display, there may exist a merit in that it may provide the user with more intuitive and unified unlocking method.

Figure 7B:
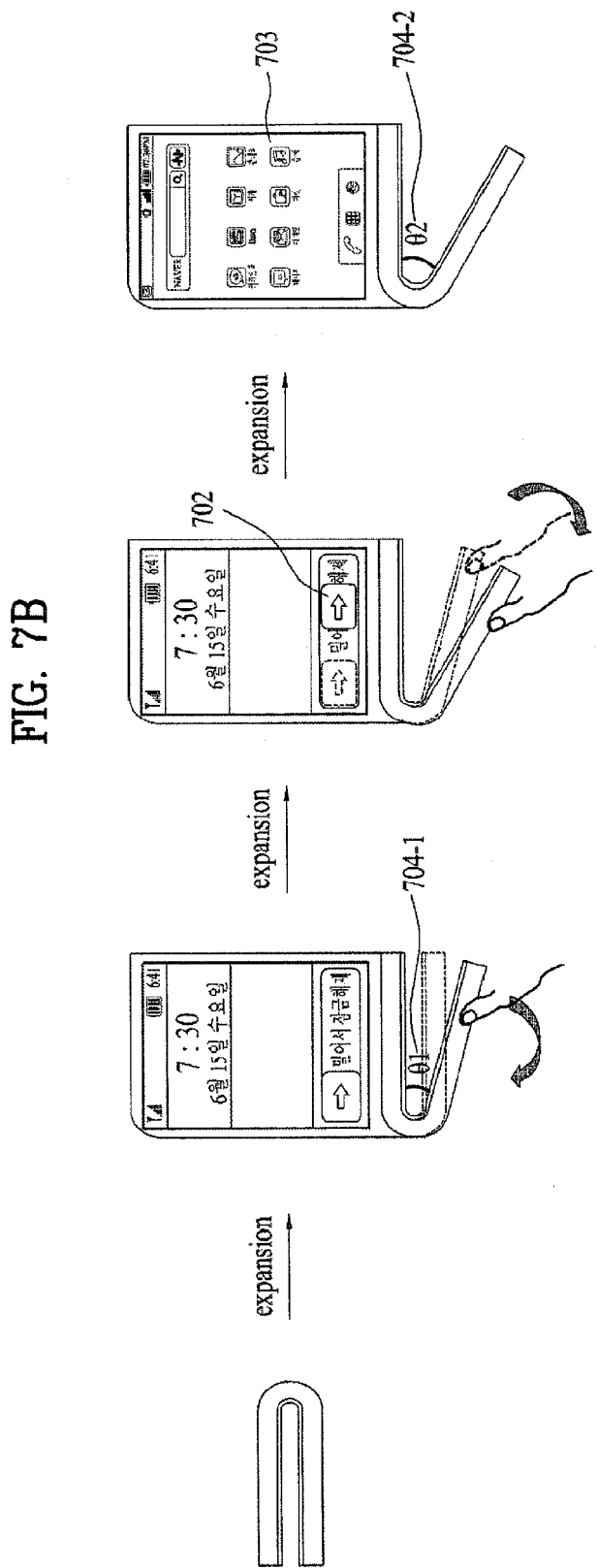
FIG. 7b is a diagram of a device indicating that an unlocking triggering signal corresponds to an expansion signal of an expandable display according to one embodiment.

FIG. 7b is a diagram of a device indicating that an unlocking triggering signal corresponds to an expansion signal of an expandable display according to one embodiment.

The device may have a 1st size status, which is a size status corresponding to a case that an angle formed by the display of the 1st region and the display of the 2nd region is 0O. And, the device may have a 2nd size status, which is a size status corresponding to a case that an angle formed by the display of the 1st region and the display of the 2nd region is not 0O. In this case, the angle may mean a practical angle. The device may be in one mode among the 1st to 3rd mode 703 in the 1st and 2nd size status.

In case that the unlocking triggering signal is detected in the 1st mode, the device may convert into the 2nd mode. The unlocking triggering signal, as mentioned in the above, may include such a various signal as a power supply signal to the display, a signal transmitted by pushing a button equipped with the device, a signal transmitted according to an expansion of the expandable display, and the like. According to the present embodiment, the unlocking triggering signal may correspond to the signal transmitted according to an unbending of the expandable display, which is unbent more than a threshold 704. The threshold 704 may mean a specific bending angle of the display. In this case, the unlocking triggering signal may correspond to the signal transmitted in case that the bending angle formed by the display of the 1st region and the display of the 2nd region is greater than a 1st angle 704-1. It may be natural to see that unbending the expandable display more than a prescribed angle may correspond to the intention of a user who is trying to use the display of the 2nd region. Hence, if the display is unbent, the device may convert from the 1st mode to the 2nd mode. Moreover, the device may convert into the 3rd mode 703 according to a touch input or an additional expansion of the expandable display from the 2nd mode. In case that the device converts according to the expansion of the expandable display, if the display is unbent more than a 2nd angle 704-2, the device may convert to the 3rd mode 703. In this case, the 2nd angle 704-2 may be greater than the 1st angle 704-1. And, the 2nd angle 704-2 may be same or smaller than 180°.

Figure 8:
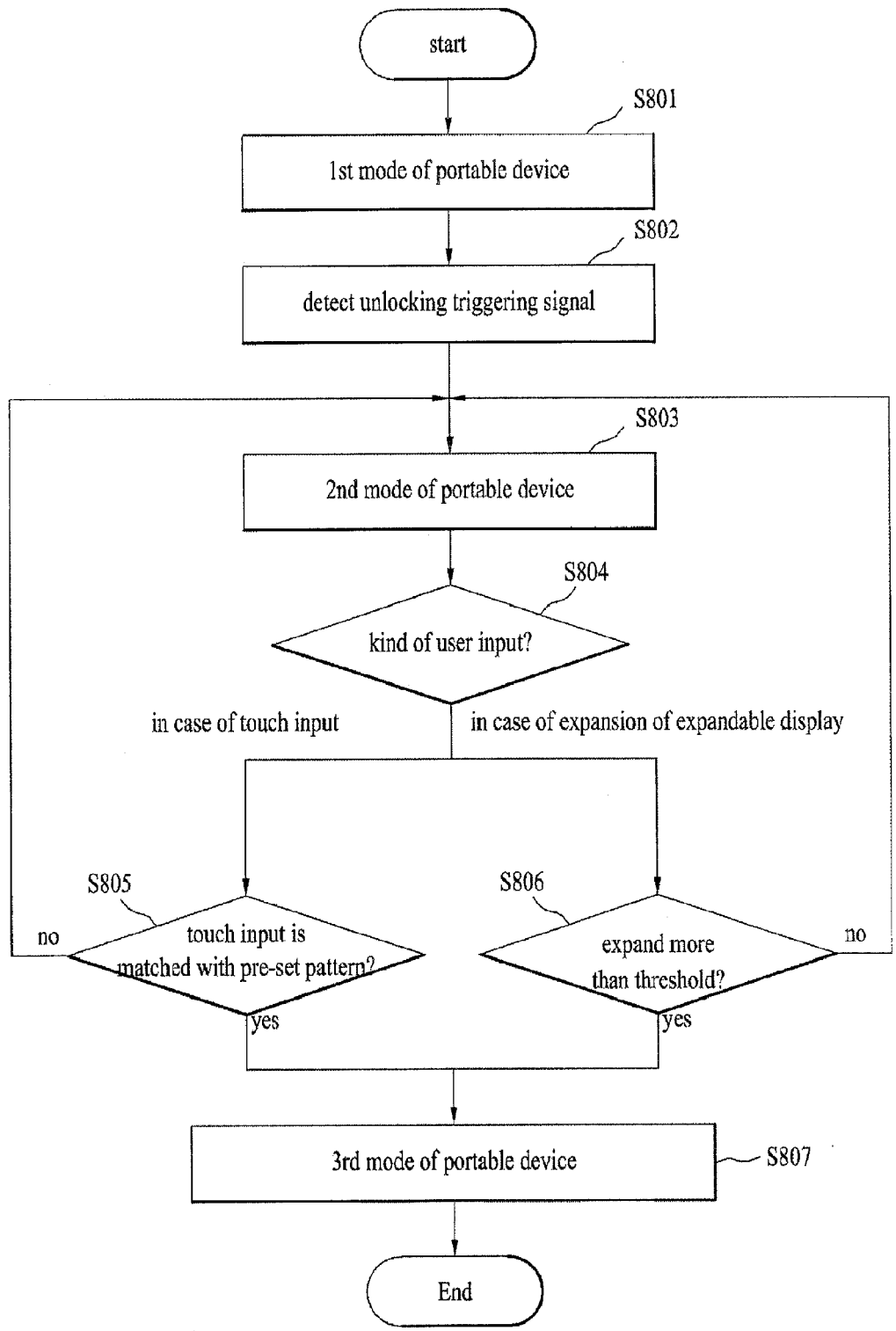

FIG. 8 is a flowchart of a portable device converting a mode according to a touch input of a user and a degree of expansion of an expandable display. According to the present flowchart, the device may be a device equipped with an expandable display including a main display and a sub display according to one embodiment. Or, the expandable display can be mounted to the device with a plurality of displays capable of being folded with a connecting unit as its center according to one embodiment. Or, the expandable display can be mounted to the device with a flexible display capable of expanding its area or a length according to one embodiment. Or, the expandable display can be mounted to the device with a flexible display capable of being bent or unbent according to one embodiment.

In case that a portable device detects an unlocking triggering signal [S802] in a first mode [S801], the device may convert into a 2nd mode [S803]. The device may display an unlocking interface in the 2nd mode.

The device may determine a kind of user input in the 2nd mode [S804].

In case that the kind of user input corresponds to a touch input, the device may recognize a touch input pattern from the touch input. Moreover, the device may judge whether the touch input pattern is matched with a pre-set pattern. In case that the touch input pattern is matched with the pre-set pattern, the device may convert into a 3rd mode [S807]. On the contrary, in case that the touch input pattern is not matched with the pre-set pattern, the device may maintain the 2nd mode [S803].

In case that the kind of user input corresponds to an expansion of the expandable display, the device may measure a degree of expansion of the expandable display. More specifically, in case that the expandable display is equipped with a main display and a sub display, the degree of expansion can be measured based on an expanded length of the sub display. Or, in case that the expandable display is equipped with a plurality of displays capable of being folded with a connecting unit as its center, the degree of expansion can be measured based on a folding angle of a plurality of the displays. Or, in case that the expandable display is equipped with a flexible display capable of being bent, the degree of expansion can be measured based on a bending angle of the display. Or, in case that the expandable display is equipped with a flexible display capable of expanding its area or length, the degree of expansion can be measured based on an expanded area or length of the display.

In case that the degree of expansion is greater than a threshold, the device may convert into the 3rd mode from the 2nd mode [S806].

Yet, in case that the degree of expansion is less than the threshold, the device may maintain the 2nd mode [S803].

FIG. 9 is a flowchart of a portable device converting a mode according to a touch input of a user and a degree of expansion of an expandable display. According to the present flowchart, the device may be a device equipped with an expandable display including a main display and a sub display according to one embodiment. Or, the expandable display can be mounted to the device with a plurality of displays capable of being folded with a connecting unit as its center according to one embodiment. Or, the expandable display can be mounted to the device with a flexible display capable of expanding its area or a length according to one embodiment. Or, the expandable display can be mounted to the device with a flexible display capable of being bent or unbent according to one embodiment.

In case that the device detects an unlocking triggering signal in the 1st mode [S901], the device may detect a kind of the unlocking triggering signal [S902].

In case that the unlocking triggering signal corresponds to a signal of power supply for the display, the device may convert into the 2nd mode [S904].

In case that the unlocking triggering signal corresponds to an expansion signal of the expandable display, the device may judge whether the expansion of the expandable display is greater than a 1st threshold. In case that the expandable display expands more than the 1st threshold, the device may convert into the 2nd mode [S903]. Yet, in case that the expandable display expands less than the 1st threshold, the device may maintain the 1st mode [S901].

In case that a user input is detected in the 2nd mode of the device, the device may identify a kind of the user input [S905].

In case that the user input corresponds to a touch input, the device may identify whether the touch input pattern is matched with a pre-set pattern. If the touch input pattern is matched with the pre-set pattern [S906], the device may convert into the 3rd mode [S908]. On the contrary, if the touch input pattern is not matched with the pre-set pattern, the device may maintain the 2nd mode [S904].

In case that the user input corresponds to an expansion of the expandable display, the device may measure a degree of expansion of the expandable display [S907]. In this case, the degree of expansion of the expandable display can be measured based on an expanded length, an area, or a bending/folding angle of the display. In case that the degree of expansion of the display is measured based on the expanded length or the area, the 1st threshold may correspond to a pre-set expanded length or area. Or, in case that the degree of expansion of the display is measured based on the bending/folding angle, the 1st threshold may correspond to a pre-set folding angle or a bending angle.

In case that the expandable display expands more than a 2nd threshold, the device may convert into the 3rd mode [S908]. In case that the expandable display expands more than the 1st threshold and less than the 2nd threshold, the device may maintain the 2nd mode [S904]. In this case, the degree of expansion can be measured based on an expanded length, area, or a bending/folding angle of the display as well. In case that the degree of expansion of the display is measured based on the expanded length or the area, the 2nd threshold may correspond to a pre-set expanded length or area. Or, in case that the degree of expansion of the display is measured based on the bending/folding angle, the 2nd threshold may correspond to a pre-set folding angle or a bending angle.

According to the present flowchart, the 2nd threshold may be greater than the 1st threshold in size. More specifically, in case that the degree of expansion is determined based on an expanded length of the display, the 2nd threshold may be longer than the 1st threshold. Or, in case that the degree of expansion is determined based on a folding or bending angle of the display, the angle of the 2nd threshold may be greater than the angle of the 1st threshold.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

And, the device and controlling method therefor may not limitedly apply to the composition and method of the aforementioned embodiments. The aforementioned embodiments may be configured in a manner of being selectively combined the whole of the embodiments or a part of the embodiments to achieve various modifications.

While the present specification has been described and illustrated herein with reference to the preferred embodiments thereof, it may be non-limited to the aforementioned specific embodiment and it will be apparent to those skilled in the art that various modifications and variations can be made therein without departing from the spirit and scope of the invention. Thus, it is intended that the technical idea and prospect of the present specification covers the modifications and variations of this invention.

And, it may be considered that a width, a length, and the like described in the present specification may indicate not only a precise width and length but also a practical width and length in a prescribed range. And, the speed measuring at each of the unit lengths can be performed at plus or minus of a prescribed length from the each of the unit lengths. In particular, the unit length of the flexible display may mean a practically expanded length and there may exist an error in a prescribed range.

And, both an apparatus invention and a method invention are explained in the present specification and the explanation on the both of the inventions can be complementally applied, if necessary.

What is claimed is:

1. A portable device, which is equipped with an expandable display, comprising:
the expandable display;
a measuring unit configured to measure a degree of expansion of the expandable display;
a sensor unit configured to detect a touch input in the expandable display; and
a processor configured to:
control the expandable display, the measuring unit and the sensor unit,
lock the portable device and deactivate the expandable display before the expandable display expands,
activate the expandable display and display an unlocking interface including an unlocking object on a pre-set course in the expandable display while the expandable display expands of which the degree of expansion being less than a first threshold, and
unlock the portable device when the expandable display expands of which the degree of expansion being greater than the first threshold,
wherein the processor is further configured to display the unlocking object moved on the pre-set course according to the degree of expansion of the expandable display.

2. The portable device of claim 1, wherein the processor is configured to deactivate at least one of the expandable display and the sensor unit before the expandable display expands.

3. The portable device of claim 1, wherein the processor is configured to activate at least one of the expandable display and the sensor unit, and display the unlocking interface, which is being provided with an animation effect according to the touch input for the expandable display or the degree of expansion of the expandable display, in the expandable display while the expandable display expands of which the degree of expansion being less than the first threshold.

4. The portable device of claim 3, wherein the animation effect is equally provided according to the touch input and the degree of expansion of the expandable display.

5. The portable device of claim 1, wherein the processor is configured to activate the expandable display and the sensor unit, and display a pre-set standby screen or an executing screen of an application, which was executed before cutting off a power of the expandable display, in the expandable display when the portable device is in an unlock mode.

6. The portable device of claim 1, wherein the degree of expansion of the expandable display comprises an expanded length of the expandable display.

7. The portable device of claim 1, wherein the degree of expansion of the expandable display comprises a folding angle of the expandable display.

8. The portable device of claim 1, wherein the degree of expansion of the expandable display comprises a bending angle of the expandable display.

9. The portable device of claim 1, wherein the processor is further configured to supply power to the expandable display when the sensor unit detects the touch input before the expandable display expands.

10. The portable device of claim 1, wherein the processor is further configured to activate the expandable display when the expandable display expands of which the degree of expansion being greater than a second threshold.

11. The portable device of claim 10, wherein the first threshold and the second threshold comprise a pre-set expanded length of the expandable display and wherein the first threshold is longer than the second threshold.

12. The portable device of claim 10, wherein the first threshold and the second threshold comprise a pre-set folding angle of the expandable display and wherein the first threshold is greater than the second threshold in angle.

13. The portable device of claim 10, wherein the first threshold and the second threshold comprise a pre-set bending angle of the expandable display and wherein the first threshold is greater than the second threshold in angle.

14. The portable device of claim 1, wherein if the processor detects an expansion signal of the expandable display and a touch input signal, the processor is configured to process the expansion signal of the expandable display prior to the touch input signal.

15. The portable device of claim 1, wherein the unlocking interface comprises a graphic user interface indicating a degree of additional expansion necessary for the expandable display to expand as much as the first threshold.

16. The portable device of claim 1, wherein the expandable display comprises a first display and a second display and wherein, when the first display and the second display are connected with each other to be folded with a connecting unit as its center, the first display is folded to the second display with the connecting unit as its center before the expandable display expands and the first display is unfolded from the second display with the connecting unit as its center after the expandable display expands.

17. The portable device of claim 1, wherein the expandable display comprises a first display and a second display, the second display is not exposed to an outside of the portable device since the second display is rolled in to the portable device before the expandable display expands and a part or a whole of the second display is exposed to the outside of the portable device since the second display is rolled out from the portable device after the expandable display expands.

18. The portable device of claim 1, wherein, when the expandable display corresponds to a flexible display, a first region of the flexible display exposed to an outside of the portable device before the flexible display expands and the first region and a second region of the flexible display additionally exposed to the outside of the portable device since the flexible display have expanded.

19. The portable device of claim 1, wherein, when the expandable display corresponds to a bendable display, a first region of the bendable display, which is bent before expanding, and the first region and a second region of the bendable display additionally expanded by unbending the bendable display after expanding.

20. A method of controlling a portable device equipped with an expandable display, comprising the steps of:
    locking the portable device and deactivating the expandable display before the expandable display expands;
    activating the expandable display and displaying an unlocking interface including an unlocking object on a pre-set course in the expandable display while the expandable display expands of which a degree of expansion of the expandable display being less than a first threshold;
    displaying the unlocking object moved on the pre-set course according to the degree of expansion of the expandable display; and
    unlocking the portable device when the expandable display expands of which the degree of expansion of the expandable display being greater than the first threshold.

* * * * *